US011989977B2

(12) United States Patent
Ramani et al.

(10) Patent No.: US 11,989,977 B2
(45) Date of Patent: May 21, 2024

(54) SYSTEM AND METHOD FOR AUTHORING HUMAN-INVOLVED CONTEXT-AWARE APPLICATIONS

(71) Applicant: Purdue Research Foundation, West Lafayette, IN (US)

(72) Inventors: Karthik Ramani, West Lafayette, IN (US); Tianyi Wang, West Lafayette, IN (US); Xun Qian, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 463 days.

(21) Appl. No.: 17/363,365

(22) Filed: Jun. 30, 2021

(65) Prior Publication Data

US 2021/0406528 A1  Dec. 30, 2021

Related U.S. Application Data

(60) Provisional application No. 63/046,253, filed on Jun. 30, 2020.

(51) Int. Cl.
*G06T 7/215* (2017.01)
*G06F 3/01* (2006.01)
(Continued)

(52) U.S. Cl.
CPC .............. *G06V 40/28* (2022.01); *G06F 3/011* (2013.01); *G06T 7/215* (2017.01); *G06T 13/40* (2013.01);
(Continued)

(58) Field of Classification Search
CPC ...... G06V 40/28; G06V 20/20; G06V 40/103; G06V 40/23; G06F 3/011; G06F 3/048;
(Continued)

(56) References Cited

U.S. PATENT DOCUMENTS

2014/0310595 A1* 10/2014 Acharya ................. G06F 3/011
715/706

OTHER PUBLICATIONS

OpenCV. 2020. Fisheye camera model. (2020). Retrieved Apr. 20, 2020 from https://docs.opencv.org/ 3.4/db/d58/group_calib3d_fisheye.html.
(Continued)

*Primary Examiner* — Nancy Bitar
*Assistant Examiner* — Dustin Bilodeau
(74) *Attorney, Agent, or Firm* — Maginot, Moore & Beck LLP

(57) ABSTRACT

A system and method for authoring and implementing context-aware applications (CAPs) are disclosed. The system and method enables users to record their daily activities and then build and deploy customized CAPs onto augmented reality platforms in which automated actions are performed in response to user-defined human actions. The system and method utilizes an integrated augmented reality platform composed of multiple camera systems, which allows for non-intrusive recording of end-users' activities and context detection while authoring and implementing CAPs. The system and method provides an augmented reality authoring interface for browsing, selecting, and editing recorded activities, and creating flexible CAPs through spatial interaction and visual programming.

19 Claims, 12 Drawing Sheets

(51) Int. Cl.
G06T 13/40 (2011.01)
G06T 19/00 (2011.01)
G06V 20/20 (2022.01)
G06V 40/10 (2022.01)
G06V 40/20 (2022.01)

(52) U.S. Cl.
CPC ............ *G06T 19/006* (2013.01); *G06V 20/20* (2022.01); *G06V 40/103* (2022.01); *G06V 40/23* (2022.01)

(58) Field of Classification Search
CPC ....... G06T 7/215; G06T 13/40; G06T 19/006; G06T 2207/20081; G06T 2207/20084; G06T 2207/30196; G06T 7/73
See application file for complete search history.

(56) References Cited

OTHER PUBLICATIONS

Manoranjan Paul, Shah ME Haque, and Subrata Chakraborty. 2013. Human detection in surveillance videos and its applications—a review. EURASIP Journal on Advances in Signal Processing 2013, 1 (2013), 176.

Isabel Pedersen. 2009. Radiating centers: augmented reality and human-centric design. In 2009 IEEE International Symposium on Mixed and Augmented Reality-Arts, Media and Humanities. IEEE, 11-16.

Charith Perera, Arkady Zaslavsky, Peter Christen, and Dimitrios Georgakopoulos. 2013. Context aware computing for the internet of things: A survey. IEEE communications surveys & tutorials 16, 1 (2013), 414-454.

Matthai Philipose. 2005. Large-scale human activity recognition using ultra-dense sensing. The Bridge, National Academy of Engineering 35, 4 (2005).

Hamed Pirsiavash and Deva Ramanan. 2012. Detecting activities of daily living in first-person camera views. In 2012 IEEE conference on computer vision and pattern recognition. IEEE, 2847-2854.

Sasank Reddy, Min Mun, Jeff Burke, Deborah Estrin, Mark Hansen, and Mani Srivastava. 2010. Using mobile phones to determine transportation modes. ACM Transactions on Sensor Networks (TOSN) 6, 2 (2010), 1-27.

Joseph Redmon and Ali Farhadi. 2018. YOLOv3: An Incremental Improvement. arXiv (2018).

Michael Rietzler, Julia Greim, Marcel Walch, Florian Schaub, Björn Wiedersheim, and Michael Weber. 2013. homeBLOX: introducing process-driven home automation. In Proceedings of the 2013 ACM conference on Pervasive and ubiquitous computing adjunct publication. 801-808.

Nazmus Saquib, Rubaiat Habib Kazi, Li-Yi Wei, and Wilmot Li. 2019. Interactive body-driven graphics for augmented video performance. In Proceedings of the 2019 CHI Conference on Human Factors in Computing Systems. 1-12.

Munehiko Sato, Ivan Poupyrev, and Chris Harrison. 2012. Touché: enhancing touch interaction on humans, screens, liquids, and everyday objects. In Proceedings of the SIGCHI Conference on Human Factors in Computing Systems. 483-492.

Lei Shi, Maryam Ashoori, Yunfeng Zhang, and Shiri Azenkot. 2018. Knock knock, what's there: converting passive objects into customizable smart controllers. In Proceedings of the 20th International Conference on Human-Computer Interaction with Mobile Devices and Services. 1-13.

Karen Simonyan and Andrew Zisserman. 2014. Very deep convolutional networks for large-scale image recognition. arXiv preprint arXiv:1409.1556 (2014).

Enox Software. 2020. OpenCv For Unity. (2020). Retrieved Apr. 20, 2020 from https://enoxsoftware.com/opencvforunity/.

Yu-Chuan Su and Kristen Grauman. 2016. Detecting engagement in egocentric video. In European Conference on Computer Vision. Springer, 454-471.

Denis Tome, Patrick Peluse, Lourdes Agapito, and Hernan Badino. 2019. xR-EgoPose: Egocentric 3D Human Pose from an HMD Camera. In Proceedings of the IEEE International Conference on Computer Vision. 7728-7738.

Khai N Truong, Elaine M Huang, and Gregory D Abowd. 2004. Camp: A magnetic poetry interface for end-user programming of capture applications for the home. In International Conference on Ubiquitous Computing. Springer, 143-160.

Blase Ur, Elyse McManus, Melwyn Pak Yong Ho, and Michael L Littman. 2014. Practical trigger-action programming in the smart home. In Proceedings of the SIGCHI Conference on Human Factors in Computing Systems. 803-812.

Mark Weiser. 1993. Hot topics-ubiquitous computing. Computer 26, 10 (1993), 71-72.

Haijun Xia, Bruno Araujo, Tovi Grossman, and Daniel Wigdor. 2016. Object-oriented drawing. In Proceedings of the 2016 CHI Conference on Human Factors in Computing Systems. 4610-4621. 14.

Weipeng Xu, Avishek Chatterjee, Michael Zollhoefer, Helge Rhodin, Pascal Fua, Hans-Peter Seidel, and Christian Theobalt. 2019. Mo 2 Cap 2: Real-time Mobile 3D Motion Capture with a Cap-mounted Fisheye Camera. IEEE transactions on visualization and computer graphics 25, 5 (2019), 2093-2101.

Jie Yin, Qiang Yang, and Jeffrey Junfeng Pan. 2008. Sensor-based abnormal human-activity detection. IEEE Transactions on Knowledge and Data Engineering 20, 8 (2008), 1082-1090.

Hong-Bo Zhang, Yi-Xiang Zhang, Bineng Zhong, Qing Lei, Lijie Yang, Ji-Xiang Du, and Duan-Sheng Chen. 2019. A comprehensive survey of vision-based human action recognition methods. Sensors 19, 5 (2019), 1005.

Yupeng Zhang, Teng Han, Zhimin Ren, Nobuyuki Umetani, Xin Tong, Yang Liu, Takaaki Shiratori, and Xiang Cao. 2013. BodyAvatar: creating freeform 3D avatars using first-person body gestures. In Proceedings of the 26th annual ACM symposium on User interface software and technology. 387-396.

Yang Zhang, Yasha Iravantchi, Haojian Jin, Swarun Kumar, and Chris Harrison. 2019. Sozu: Self-Powered Radio Tags for Building-Scale Activity Sensing. In Proceedings of the 32nd Annual ACM Symposium on User Interface Software and Technology. 973-985.

Yang Zhang, Gierad Laput, and Chris Harrison. 2017. Electrick: Low-cost touch sensing using electric field tomography. In Proceedings of the 2017 CHI Conference on Human Factors in Computing Systems. 1-14.

Yang Zhang, Gierad Laput, and Chris Harrison. 2018. Vibrosight: Long-Range Vibrometry for Smart Environment Sensing. In Proceedings of the 31st Annual ACM Symposium on User Interface Software and Technology. 225-236.

Yue Zhao, Yuanjun Xiong, Limin Wang, Zhirong Wu, Xiaoou Tang, and Dahua Lin. 2017. Temporal action detection with structured segment networks. In Proceedings of the IEEE International Conference on Computer Vision. 2914-2923.

Stereolabs. 2019. ZED Mini Stereo Camera—Stereolabs. (2019). Retrieved Sep. 1, 2019 from https://www.stereolabs.com/zed-mini/.

Andrey Ignatov. 2018. Real-time human activity recognition from accelerometer data using Convolutional Neural Networks. Applied Soft Computing 62 (2018), 915-922.

Panos Markopoulos. 2016. Ambient intelligence: vision, research, and life. Journal of Ambient Intelligence and Smart Environments 8, 5 (2016), 491-499.

FinalIK. 2019. FinalIK. (2019). Retrieved Sep. 1, 2019 from https://assetstore.unity.com/packages/tools/animation/final-ik-14290.

2019. Oculus. (2019). https://www.oculus.com/.

Mohammad Abu Alsheikh, Ahmed Selim, Dusit Niyato, Linda Doyle, Shaowei Lin, and Hwee-Pink Tan. 2016. Deep activity recognition models with triaxial accelerometers. In Workshops at the Thirtieth AAAI Conference on Artificial Intelligence.

Fraser Anderson, Tovi Grossman, and George Fitzmaurice. 2017. Trigger-Action-Circuits: Leveraging Generative Design to Enable Novices to Design and Build Circuitry. In Proceedings of the 30th Annual ACM Symposium on User Interface Software and Technology. 331-342.

(56) References Cited

OTHER PUBLICATIONS

Daniel Ashbrook and Thad Starner. 2003. Using GPS to learn significant locations and predict movement across multiple users. Personal and Ubiquitous computing 7, 5 (2003), 275-286.
Daniel Ashbrook and Thad Starner. 2010. Magic: a motion gesture design tool. In Proceedings of the SIGCHI Conference on Human Factors in Computing Systems. 2159-2168.
Microsoft Azure. 2020. Azure Kinect DK. (2020). Retrieved Apr. 20, 2020 from https://azure.microsoft.com/en-us/services/kinect-dk/.
Michael Buettner, Richa Prasad, Matthai Philipose, and David Wetherall. 2009. Recognizing daily activities with RFID-based sensors. In Proceedings of the 11th international conference on Ubiquitous computing. 51-60.
Yuanzhi Cao, Xun Qian, Tianyi Wang, Rachel Lee, Ke Huo, and Karthik Ramani. 2020. An Exploratory Study of Augmented Reality Presence for Tutoring Machine Tasks. In Proceedings of the 2020 CHI Conference on Human Factors in Computing Systems. 1-13.
Yuanzhi Cao, Tianyi Wang, Xun Qian, Pawan S Rao, Manav Wadhawan, Ke Huo, and Karthik Ramani. 2019. GhostAR: A Time-space Editor for Embodied Authoring of Human-Robot Collaborative Task with Augmented Reality. In Proceedings of the 32nd Annual ACM Symposium on User Interface Software and Technology. 521-534.
Z. Cao, G. Hidalgo Martinez, T. Simon, S. Wei, and Y. A. Sheikh. 2019. OpenPose: Realtime Multi-Person 2D Pose Estimation using Part Affinity Fields. IEEE Transactions on Pattern Analysis and Machine Intelligence (2019).
Liming Chen, Jesse Hoey, Chris D Nugent, Diane J Cook, and Zhiwen Yu. 2012. Sensor-based activity recognition. IEEE Transactions on Systems, Man, and Cybernetics, Part C (Applications and Reviews) 42, 6 (2012), 790-808.
Pei-Yu Chi, Daniel Vogel, Mira Dontcheva, Wilmot Li, and Bjorn Hartmann. 2016. Authoring illustrations of human movements by iterative physical demonstration. In Proceedings of the 29th Annual Symposium on User Interface Software and Technology. 809-820.
Jeannette Shiaw-Yuan Chin, Victor Callaghan, and Graham Clarke. 2006. An End-User Programming Paradigm for Pervasive Computing Applications . . . In ICPS, vol. 6. 325-328.
Jose Danado and Fabio Paternò. 2014. Puzzle: A mobile application development environment using a jigsaw metaphor. Journal of Visual Languages & Computing 25, 4 (2014), 297-315.
Luigi De Russis and Fulvio Corno. 2015. Homerules: A tangible end-user programming interface for smart homes. In Proceedings of the 33rd Annual ACM Conference Extended Abstracts on Human Factors in Computing Systems. 2109-2114.
Anind K Dey, Gregory D Abowd, and others. 2000. The context toolkit: Aiding the development of context-aware applications. In Workshop on Software Engineering for wearable and pervasive computing. 431-441.
Anind K Dey, Raffay Hamid, Chris Beckmann, Ian Li, and Daniel Hsu. 2004. a CAPpella: programming by demonstration of context-aware applications. In Proceedings of the SIGCHI conference on Human factors in computing systems. 33-40.
Anind K Dey, Timothy Sohn, Sara Streng, and Justin Kodama. 2006. iCAP: Interactive prototyping of context-aware applications. In International Conference on Pervasive Computing. Springer, 254-271.
Barrett Ens, Fraser Anderson, Tovi Grossman, Michelle Annett, Pourang Irani, and George Fitzmaurice. 2017. Ivy: Exploring spatially situated visual programming for authoring and understanding intelligent environments. In Proceedings of the 43rd Graphics Interface Conference. 156-162.
Alireza Fathi and James M Rehg. 2013. Modeling actions through state changes. In Proceedings of the IEEE Conference on Computer Vision and Pattern Recognition. 2579-2586.
Basura Fernando, Sareh Shirazi, and Stephen Gould. 2017. Unsupervised human action detection by action matching. In Proceedings of the IEEE Conference on Computer Vision and Pattern Recognition Workshops. 1-9.

Google. 2020. Tensorflow. (2020). Retrieved Apr. 20, 2020 from https://www.tensorflow.org/.
Ankit Gupta, Maneesh Agrawala, Brian Curless, and Michael Cohen. 2014. Motionmontage: A system to annotate and combine motion takes for 3d animations. In Proceedings of the SIGCHI Conference on Human Factors in Computing Systems. 2017-2026.
Ankit Gupta, Dieter Fox, Brian Curless, and Michael Cohen. 2012. DuploTrack: a real-time system for authoring and guiding duplo block assembly. In Proceedings of the 25th annual ACM symposium on User interface software and technology. 389-402.
Bjorn Hartmann, Leith Abdulla, Manas Mittal, and Scott R Klemmer. 2007. Authoring sensor-based interactions by demonstration with direct manipulation and pattern recognition. In Proceedings of the SIGCHI conference on Human factors in computing systems. 145-154.
Robert Held, Ankit Gupta, Brian Curless, and Maneesh Agrawala. 2012. 3D puppetry: a kinect-based interface for 3D animation . . . In UIST. Citeseer, 423-434.
Valentin Heun, James Hobin, and Pattie Maes. 2013. Reality editor: programming smarter objects. In Proceedings of the 2013 ACM conference on Pervasive and ubiquitous computing adjunct publication. 307-310.
Jan Humble, Andy Crabtree, Terry Hemmings, Karl-Petter Åkesson, Boriana Koleva, Tom Rodden, and Pär Hansson. 2003. "Playing with the Bits" User-configuration of Ubiquitous Domestic Environments. In International Conference on Ubiquitous Computing. Springer, 256-263.
Ke Huo, Yuanzhi Cao, Sang Ho Yoon, Zhuangying Xu, Guiming Chen, and Karthik Ramani. 2018. Scenariot: spatially mapping smart things within augmented reality scenes. In Proceedings of the 2018 CHI Conference on Human Factors In Computing Systems. 1-13.
IFTTT. 2020. IFTTT. (2020). Retrieved Apr. 1, 2020 from https://ifttt.com.
CN Joseph, S Kokulakumaran, K Srijeyanthan, A Thusyanthan, C Gunasekara, and CD Gamage. 2010. A framework for whole-body gesture recognition from video feeds. In 2010 5th International Conference on Industrial and Information Systems. IEEE, 430-435.
Georgios Kapidis, Ronald Poppe, Elsbeth van Dam, Lucas PJJ Noldus, and Remco C Veltkamp. 2019. Egocentric Hand Track and Object-based Human Action Recognition. arXiv preprint arXiv:1905.00742 (2019).
Ju-Whan Kim, Han-Jong Kim, and Tek-Jin Nam. 2016. M. gesture: an acceleration-based gesture authoring system on multiple handheld and wearable devices. In Proceedings of the 2016 CHI Conference on Human Factors in Computing Systems. 2307-2318.
Yongkwan Kim and Seok-Hyung Bae. 2016. SketchingWithHands: 3D sketching handheld products with first-person hand posture. In Proceedings of the 29th Annual Symposium on User Interface Software and Technology. 797-808.
Michael Laielli, James Smith, Giscard Biamby, Trevor Darrell, and Bjoern Hartmann. 2019. LabelAR: A Spatial Guidance Interface for Fast Computer Vision Image Collection. In Proceedings of the 32nd Annual ACM Symposium on User Interface Software and Technology. 987-998.
Gierad Laput, Eric Brockmeyer, Scott E Hudson, and Chris Harrison. 2015. Acoustruments: Passive, acoustically-driven, interactive controls for handheld devices. In Proceedings of the 33rd Annual ACM Conference on Human Factors in Computing Systems. 2161-2170.
Gierad Laput, Robert Xiao, and Chris Harrison. 2016. Viband: High-fidelity bio-acoustic sensing using commodity smartwatch accelerometers. In Proceedings of the 29th Annual Symposium on User Interface Software and Technology. 321-333.
Bokyung Lee, Minjoo Cho, Joonhee Min, and Daniel Saakes. 2016. Posing and acting as input for personalizing furniture. In Proceedings of the 9th Nordic Conference on Human-Computer Interaction. 1-10.
Jisoo Lee, Luis Garduño, Erin Walker, and Winslow Burleson. 2013. A tangible programming tool for creation of context-aware applications. In Proceedings of the 2013 ACM international joint conference on Pervasive and ubiquitous computing. 391-400.

(56) References Cited

OTHER PUBLICATIONS

Hanchuan Li, Can Ye, and Alanson P Sample. 2015. IDSense: A human object interaction detection system based on passive UHF RFID. In Proceedings of the 33rd Annual ACM Conference on Human Factors in Computing Systems. 2555-2564.

Toby Jia-Jun Li, Yuanchun Li, Fanglin Chen, and Brad A Myers. 2017. Programming IoT devices by demonstration using mobile apps. In International Symposium on End User Development. Springer, 3-17.

Yanghao Li, Cuiling Lan, Junliang Xing, Wenjun Zeng, Chunfeng Yuan, and Jiaying Liu. 2016. Online human action detection using joint classification-regression recurrent neural networks. In European Conference on Computer Vision. Springer, 203-220.

David Lindlbauer and Andy D Wilson. 2018. Remixed reality: manipulating space and time in augmented reality. In Proceedings of the 2018 CHI Conference on Human Factors in Computing Systems. 1-13.

Yang Liu, Ping Wei, and Song-Chun Zhu. 2017. Jointly recognizing object fluents and tasks in egocentric videos. 13 In Proceedings of the IEEE International Conference on Computer Vision. 2924-2932.

Hao Lü and Yang Li. 2012. Gesture coder: a tool for programming multi-touch gestures by demonstration. In Proceedings of the SIGCHI Conference on Human Factors in Computing Systems. 2875-2884.

Hao Lü and Yang Li. 2013. Gesture studio: authoring multi-touch interactions through demonstration and declaration. In Proceedings of the SIGCHI Conference on Human Factors in Computing Systems. 257-266.

Ana I Maqueda, Carlos R del Blanco, Fernando Jaureguizar, and Narciso Garcia. 2015. Human-action recognition module for the new generation of augmented reality applications. In 2015 International Symposium on Consumer Electronics (ISCE). IEEE, 1-2.

Makoto Ono, Buntarou Shizuki, and Jiro Tanaka. 2013. Touch & activate: adding interactivity to existing objects using active acoustic sensing. In Proceedings of the 26th annual ACM symposium on User interface software and technology. 31-40.

\* cited by examiner

SYSTEM AND METHOD FOR AUTHORING HUMAN-INVOLVED CONTEXT-AWARE APPLICATIONS

This application claims the benefit of priority of U.S. provisional application Ser. No. 63/046,253, filed on Jun. 30, 2020 the disclosure of which is herein incorporated by reference in its entirety.

GOVERNMENT LICENSE RIGHTS

This invention was made with government support under contract number 1937036 awarded by the National Science Foundation. The government has certain rights in the invention.

FIELD

The device and method disclosed in this document relates to augmented reality and, more particularly, to authoring human-involved context aware applications with augmented reality.

BACKGROUND

Unless otherwise indicated herein, the materials described in this section are not admitted to be the prior art by inclusion in this section.

The concept of ubiquitous computing has been gradually substantiated by the rapid growth of the Internet of Things (IoT) products. One of the critical differentiators between emerging IoT systems and classic telecontrol systems is the intelligence introduced by IoT devices' context-awareness. Understanding the context of users and environments empowers the IoT systems to deliver timely and appropriate service without explicit interference from users. With the IoT devices acting as perception units, inferring environmental contexts, such as room temperature, lighting, moisture, etc., can be easily achieved.

Although accurately inferring activity is an essential component of an advanced context-aware application (CAP), inferring human activity remains challenging. Firstly, human actions are pervasive and spatial. A meaningful human action may happen anywhere, such as drinking coffee in a living room or doing yoga in a bedroom. Secondly, human actions can be delicate and complex. A human action may involve the movement of the human body and both hands, and sometimes involve objects. Thirdly, human actions are ambiguous and subtle. The intention of a human action usually depends on relevant context information such as objects, location and time. For instance, picking up a cup in the morning and in the evening could suggest different intentions, i.e., drinking coffee and drinking milk.

One way of enabling pervasive human action detection is by embedding more advanced sensors into our surroundings, such as RFID, electric field, acoustic, and vision-based sensors. However, these sensors are embedded into the environment or the objects, which implies the scalability of CAPs will be greatly hampered. Research has shown multiple other approaches for human action detection, but they often suffer from coarse granularity. Moreover, these methods are usually dedicated only to human action detection and may fail in cases of human-object interactions. What is needed is a method for implementing advanced context-aware applications that does not require large numbers of sensors embedded into the environment, supports human-object interactions, and which also provides an intuitive CAP authoring experience for users.

SUMMARY

A method for authoring an automation in which an operation is performed responsive to human actions in an environment is disclosed. The method comprises synchronously recording, with at least one sensor, (i) human motions of a user in an environment, the recorded human motions including a plurality of recorded poses of the user in the environment over a period of time, and (ii) values for a context attribute over the period of time. The method further comprises displaying, on a display, a graphical user interface including, superimposed on the environment, (i) a graphical representation of the recorded human motions and (ii) a graphical representation of the recorded values for the context attribute. The method further comprises defining, with a processor, a first event by identifying, based on user inputs received from the user, (i) a first segment of the recorded human motions that corresponds to the first event and (ii) a first value for the context attribute that corresponds to the first event. The method further comprises defining, with the processor, based on user inputs received from the user, a first operation to be performed in response to the first event occurring.

A further method for authoring an automation in which an operation is performed responsive to human actions in an environment is disclosed. The method comprises recording, with at least one sensor, human motions of a user in an environment, the recorded human motions including a plurality of recorded poses of the user in the environment over a period of time. The method further comprises displaying, on a display, a graphical user interface including, a graphical representation of the recorded human motions superimposed on the environment. The method further comprises defining, with a processor, a first event by identifying, based on user inputs received from the user, a first segment of the recorded human motions that corresponds to the first event. The method further comprises defining, with the processor, based on user inputs received from the user, a first operation to be performed in response to the first event occurring.

BRIEF DESCRIPTION OF THE DRAWINGS

The foregoing aspects and other features of the system and method are explained in the following description, taken in connection with the accompanying drawings.

DETAILED DESCRIPTION

Figure 1:
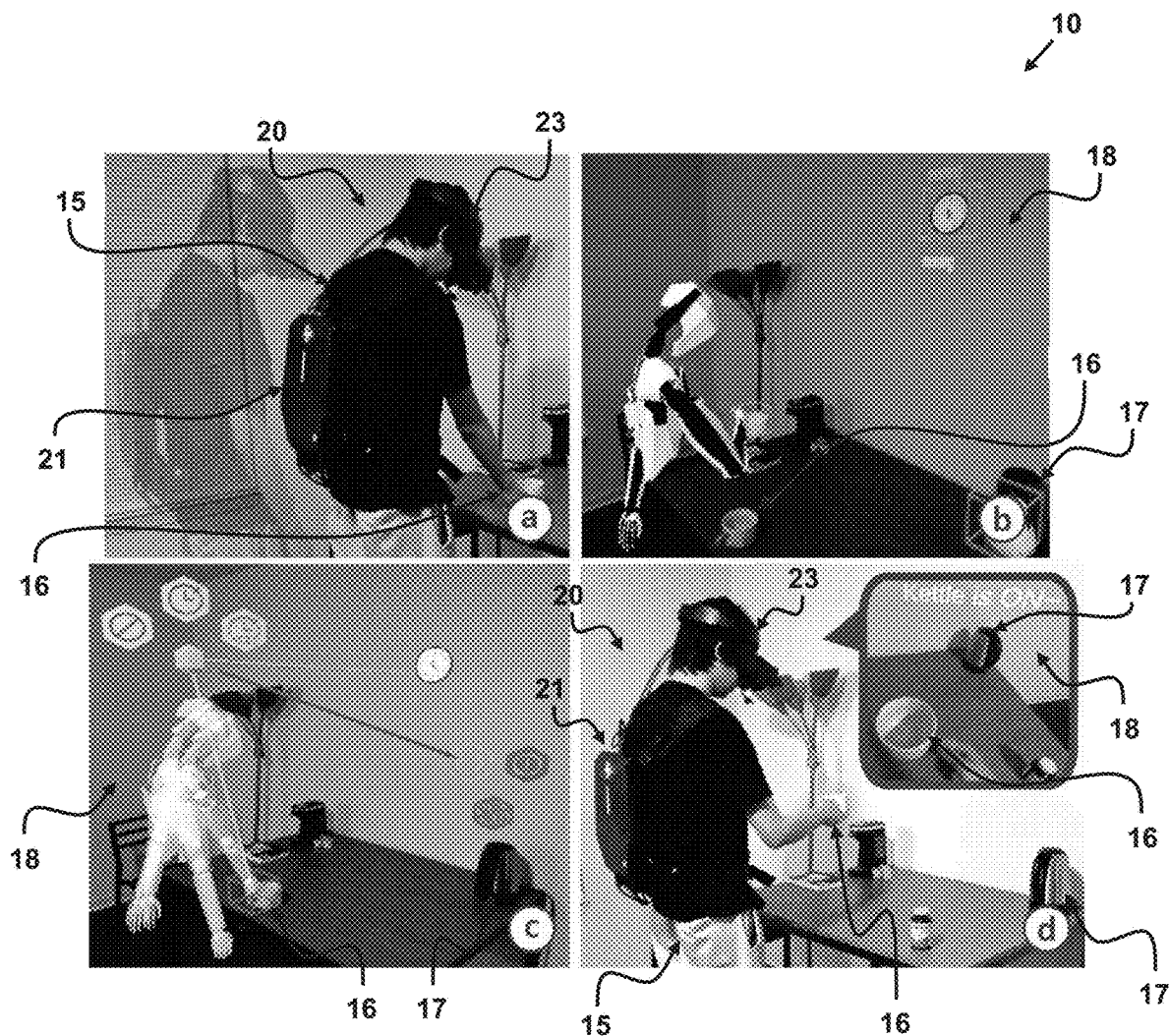
FIG. 1 shows a context-aware application (CAP) authoring system and a workflow thereof.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

The methods and systems described herein overcome the current challenges in implementing and authoring advanced context-aware applications (CAPs) by incorporating a wearable augmented reality head mounted device (AR-HMD). Wearable devices provide a promising approach to address the pervasiveness of human actions due to their always-on and always-with-user nature. In particular, the emerging AR-HMDs offer rich environmental sensing capabilities, including 6 degrees of freedom tracking and an egocentric vision system that provides high-quality data for accurately inferring the delicate human-object interactions. CAPs built with wearable platforms are less dependent on the external infrastructures, as their perception capabilities are intrinsic. Furthermore, compared to traditional graphical user interfaces, augmented reality (AR) allows users to more directly experience the advantages of in-situ visualization of human activities through virtual human avatars and virtual replicas of objects in AR. An AR authoring interface allows users to intuitively view their own previous actions and precisely label the desired motions for authoring and training CAPs. Finally, during the authoring process, users can freely walk around the AR scene and perform spatial interactions with the virtual replicas Internet of Things (IoT) devices and other objects. In this way, users can easily associate the human actions with relevant context information from the environment and IoT devices.

System Overview

Figure 2:
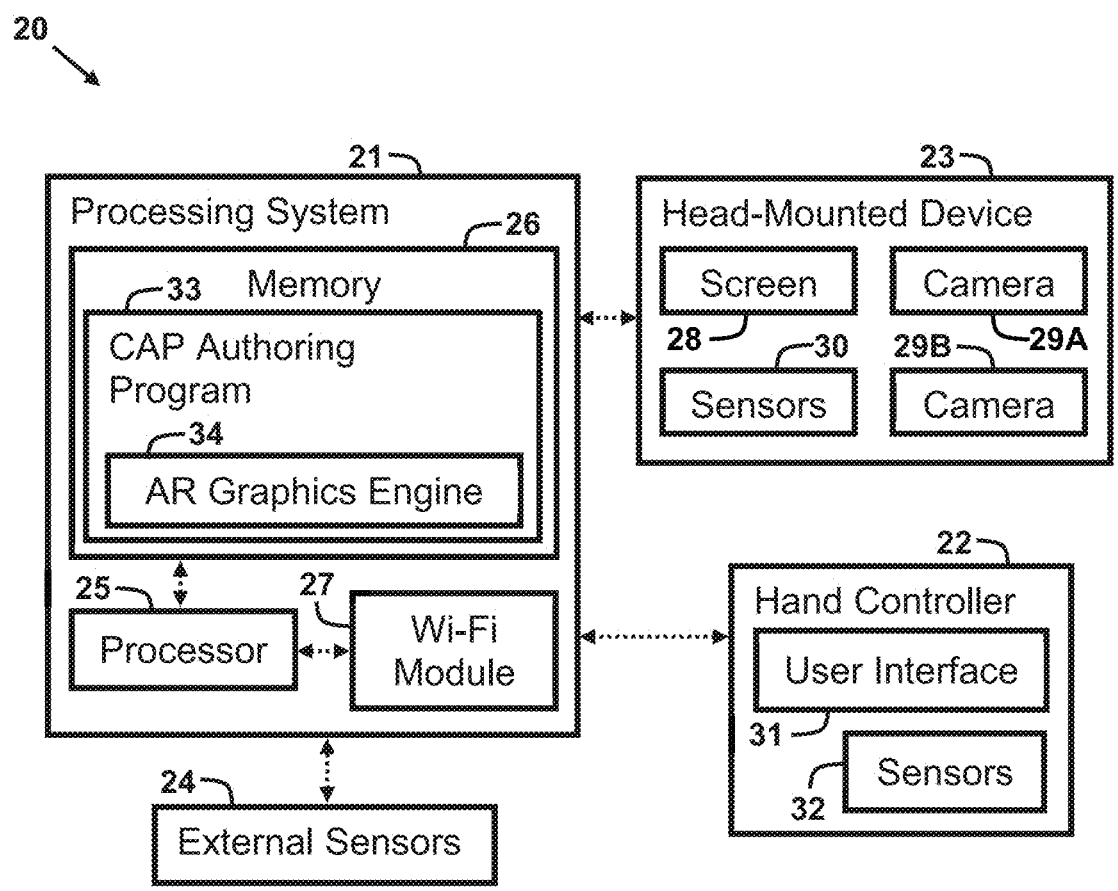
FIG. 2 shows exemplary components of the augmented reality (AR) system of the CAP system.

With reference to FIGS. 1-2, exemplary embodiments of a context-aware application (CAP) authoring system 10 are described. The CAP authoring system 10 is an augmented reality (AR)-based authoring and automation system that enables users to record their daily activities and then build and deploy customized CAPs onto AR platforms in which automated actions are performed in response to user-defined human actions. The CAP authoring system 10 advantageously provides an all-in-one workflow for creating human-involved context models using end-users' realistic daily activities and authoring customized CAPs in AR. The CAP authoring system 10 advantageously utilizes an integrated augmented reality platform composed of multiple camera systems, which allows for non-intrusive recording of end-users' activities and context detection while authoring and implementing CAPs. The CAP authoring system 10 advantageously provides an AR authoring interface for browsing, selecting, and editing recorded activities, and creating flexible CAPs through spatial interaction and visual programming.

As shown in FIG. 1, the CAP authoring system 10 at least includes an AR system 20, at least part of which is worn or held by a user 15, and one or more objects in the environment, some of which may be IoT devices. The AR system 20 preferably includes an AR head-mounted display (AR-HMD) 23 having at least a camera and a display screen, but may include any mobile AR device, such as, but not limited to, a smartphone, a tablet computer, a handheld camera, or the like having a display screen and a camera. In one example, the AR-HMD 23 is in the form of an AR or virtual reality headset (e.g., Microsoft's HoloLens, Oculus Rift, or Oculus Quest) having an integrated or attached front-facing stereo-camera (e.g., ZED Dual 4MP Camera (720p, 60 fps)). In at least some embodiments, in addition to a front-facing stereo-camera, the AR-HMD 23 further includes downward-looking fisheye camera (e.g., 1080p, 60 fps, 180° FOV) for capturing motions of the user 15.

In the example of FIG. 1, the user 15 records his daily activities while wearing the AR-HMD 23 (FIG. 1(a)), which includes walking to a table after waking up in the morning, picking up a cup 16, and making some hot tea with a kettle 17. The AR system 20 records these daily activities as the user 15 goes about his day. Next, an AR graphical user interface 18 of the AR-HMD 23 enables the user 15 to visualize these daily activities, as well as abstract spatial and temporal contextual information such as time of day and the states of the objects in the environment (FIG. 1(b)). Using the AR graphical user interface 18, the user can define trigger events as corresponding to combinations of (i) certain motions of the recorded daily activities (e.g., the user picking up the cup 16) and (ii) certain contextual information (e.g., in the morning). After defining a trigger event, the AR graphical user interface 18 provides a visual programming interface that enables to user to author a CAP in which one or more actions are performed in response to detecting the trigger event (FIG. 1(c)). In the illustrated example, the authored CAP detects when the user picks up the cup 16 in the morning, and causes the kettle 17 to turn on automatically to heat water for making hot tea and information regarding the state of the kettle 17 (e.g., "Kettle is ON~") is displayed to the user 15 in the AR graphical user interface 18 (FIG. 1(d)).

The CAP authoring system 10 provides several advantages over conventional end-user programming interfaces for CAPs and other automations. Particularly, the CAP authoring system 10 advantageously provides an always-on activity recording and detecting and enables end-users to customize sophisticated context models. The CAP authoring system 10 enables the capture of arbitrarily long human motions in daily life which include both unintentional and intentional patterns. Instead of performing the demonstrations one by one, the CAP authoring system 10 provides fast browsing and selection of desired actions from cluttered and lengthy recordings. Moreover, the CAP authoring system 10 assists users in identifying similar patterns by applying a pattern recognition algorithm to the entire recording. Then, users can refine the action recognition algorithm by simply labeling the false positive similar actions and the true positive similar actions. Additionally, most conventional end-user programming interfaces are device-centered and are limited to IoT-only interactions and automations. Human actions, however, are not well supported in such interfaces mainly because of the lack of capability to detect and visualize human actions. The CAP authoring system 10 expands the scope of human interactions from specialized IoT devices to daily ordinary objects. Further, as an AR authoring tool, the CAP authoring system 10 enables users to visually program the rules in-situ by spatially connecting the context action and an IoT function. In these ways, the CAP authoring system 10 allows end-users to define the contextual information and the desired task-relevant service in a clear and intuitive manner.

FIG. 2 shows exemplary components of the AR system 20 of the CAP authoring system 10. It should be appreciated that the components of the AR system 20 shown and described are merely exemplary and that the AR system 20 may comprise any alternative configuration. Moreover, in the illustration of FIG. 2, only a single AR system 20 is shown. However, in practice the CAP authoring system 10 may include one or multiple AR systems 20.

In the illustrated exemplary embodiment, the AR system 20 includes a processing system 21, the AR-HMD 23, at least one hand-held controller 22 (e.g., Oculus Touch controllers), and (optionally) external sensors 24. In some embodiments, the processing system 21 may comprise a discrete computer that is configured to communicate with the AR-HMD 23, as well as the at least one hand-held controller 22 and any external sensors 24, via one or more wired or wireless connections. In the illustrated exemplary embodiment of FIG. 1, the processing system 21 takes the form of a backpack computer connected to the AR-HMD 23. However, in alternative embodiments, the processing system 21 is integrated with the AR-HMD 23. Moreover, the processing system 21 may incorporate server-side cloud processing systems.

As shown in FIG. 2, the processing system 21 comprises a processor 25 and a memory 26. The memory 26 is configured to store data and program instructions that, when executed by the processor 25, enable the AR system 20 to perform various operations described herein. The memory 26 may be of any type of device capable of storing information accessible by the processor 25, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 25 may include a system with a central processing unit, graphics processing units, multiple processing units, dedicated circuitry for achieving functionality, programmable logic, or other processing systems.

The processing system 21 further comprises one or more transceivers, modems, or other communication devices configured to enable communications with various other devices, at least including any IoT devices in the environment, the hand-held controllers 22, and the external sensors 24 (if applicable). Particularly, in the illustrated embodiment, the processing system 21 comprises a Wi-Fi module 27. The Wi-Fi module 27 is configured to enable communication with a Wi-Fi network and/or Wi-Fi router (not shown) and includes at least one transceiver with a corresponding antenna, as well as any processors, memories, oscillators, or other hardware conventionally included in a Wi-Fi module. As discussed in further detail below, the processor 25 is configured to operate the Wi-Fi module 27 to send and receive messages, such as control and data messages, to and from the IoT devices via the Wi-Fi network and/or Wi-Fi router. It will be appreciated, however, that other communication technologies, such as Bluetooth, Z-Wave, Zigbee, or any other radio frequency-based communication technology can be used to enable data communications between devices in the system 10.

In the illustrated exemplary embodiment, the AR-HMD 23 comprises a display screen 28 and cameras 29A and 29B. As noted above, the cameras of the AR-HMD 23 include a front-facing stereo camera 29A and a downward-looking fisheye camera 29B. The cameras 29A, 29B are configured to capture a plurality of images of the environment as the AR-HMD 23 is moved through the environment by the user 15. The camera 29A, 29B are configured to generate image frames of the environment, each of which comprises a two-dimensional array of pixels. Each pixel has corresponding photometric information (intensity, color, and/or brightness). The front-facing stereo camera 29A is, in particular, configured to generate RGB-D images in which each pixel has corresponding photometric information and geometric information (depth and/or distance). In such embodiments, the front-facing stereo camera 29A may, for example, take the form of two RGB cameras configured to capture stereoscopic images, from which depth and/or distance information can be derived or, alternatively, an RGB camera with an associated IR camera configured to provide depth and/or distance information.

The display screen 28 may comprise any of various known types of displays, such as LCD or OLED screens. In at least one embodiment, the display screen 28 is a transparent screen, through which a user can view the outside world, on which certain graphical elements are superimposed onto the user's view of the outside world. In the case of a non-transparent display screen 28, the graphical elements may be superimposed on real-time images/video captured by the front-facing stereo camera 29A. In further embodiments, the display screen 28 may comprise a touch screen configured to receive touch inputs from a user.

In some embodiments, the AR-HMD 23 may further comprise a variety of sensors 30. In some embodiments, the sensors 30 include sensors configured to measure one or more accelerations and/or rotational rates of the AR-HMD 23. In one embodiment, the sensors 30 comprises one or more accelerometers configured to measure linear accelerations of the AR-HMD 23 along one or more axes (e.g., roll, pitch, and yaw axes) and/or one or more gyroscopes configured to measure rotational rates of the AR-HMD 23 along one or more axes (e.g., roll, pitch, and yaw axes). In some embodiments, the sensors 30 include Lidar or IR cameras. In some embodiments, the sensors 30 may include inside-out motion tracking sensors configured to track human body motion of the user 15 within the environment, in particular positions and movements of the head, arms, and hands of the user 15.

The AR-HMD 23 may also include a battery or other power source (not shown) configured to power the various components within the AR-HMD 23, which may include the processing system 21, as mentioned above. In one embodiment, the battery of the AR-HMD 23 is a rechargeable battery configured to be charged when the AR-HMD 23 is connected to a battery charger configured for use with the AR-HMD 23.

In the illustrated exemplary embodiment, the hand-held controller(s) 22 comprises a user interface 31 and sensors 32. The user interface 31 comprises, for example, one or more buttons, joysticks, triggers, or the like configured to enable the user 15 to interact with the CAP authoring system 10 by providing inputs. In one embodiment, the sensors 30 may comprise one or more accelerometers configured to measure linear accelerations of the hand-held controller 22 along one or more axes and/or one or more gyroscopes configured to measure rotational rates of the hand-held controller 22 along one or more axes. The hand-held controller(s) 22 further include one or more transceivers (not shown) configured to communicate inputs from the user 15 to the processing system 21. In some embodiments, rather than being grasped by the user, the hand-held controller(s) 22 are in the form of a glove, which is worn by the user and the user interface includes sensors for detecting gesture-based inputs or the like.

The program instructions stored on the memory 26 include a context-aware application (CAP) authoring program 33. As discussed in further detail below, the processor 25 is configured to execute the CAP authoring program 33 to enable the authorship and performance of CAPs by the user 15. In one embodiment, the CAP authoring program 33 includes an AR graphics engine 34 (e.g., Unity3D engine), which provides an intuitive visual interface for the CAP authoring program 33. Particularly, the processor 25 is configured to execute the AR graphics engine 34 to superimpose on the display screen 28 graphical elements for the purpose of authoring CAPs, as well as providing graphics and information as a part of the performance of the CAPs. In the case of a non-transparent display screen 28, the graphical elements may be superimposed on real-time images/video captured by the front-facing stereo camera 29A.

Figure 3:
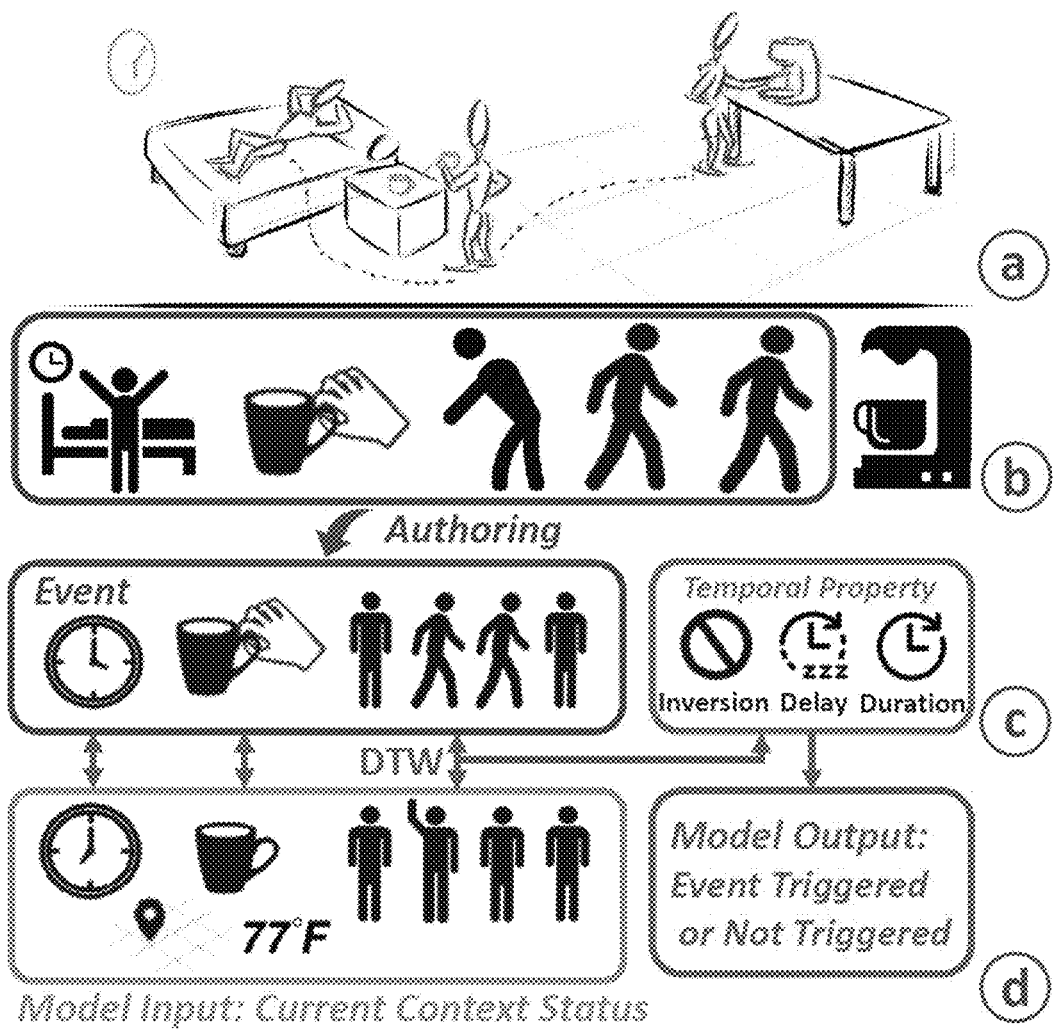
FIG. 3 illustrates a basic framework utilized by the CAP authoring system to enable a user to author and implement a CAP.

FIG. 3 illustrates the basic framework utilized by the CAP authoring program 33 to enable a user to author and implement a CAP. The framework borrows the metaphor from object-oriented programming and substantiates the abstract contextual information as (1) human action, (2) context attributes, and (3) events. As used herein, a "human action" refers to any motions or body movements of a person. However, the human actions that are of particular interest in defining events are, generally, those that reveal the person's intention. A human action is represented by a sequence of human poses. As will be described in further detail below, the CAP authoring program 33 enables the user to define a human action by selecting a segment from his or her recorded human motions.

Additionally, as used herein, a "context attribute" refers to any descriptor that represents some aspect of the environment or other contextual information surrounding recorded human motions of a person. The primary context attributes of interest that are described in detail herein include (1) an object that is interacted with by a person during recorded human motions, (2) a spatial location of the person during recorded human motions, (3) a time of day of during recorded human motions, and (4) a position, orientation, or state of an object during recorded human motions. However, the context attributes may include any other additional contextual and/or environmental information (e.g., temperature, weather, weather forecast, lighting, humidity, day of the week, month, etc.).

Finally, as used herein, an "event" or "trigger event" refers to a set of circumstances that is to be detected and which will trigger performance of some action in response to detection. In general, the events described herein are defined as a combination of a particular human action and particular values for one or more context attributes defining the context of the particular human action. In the previous example of FIG. 1, an event was defined to include the "picking up" human action combined with two context attributes of (i) the "cup" object interaction attribute and (ii) the "morning" time of day attribute. However, in some instances, an event can be defined only as a particular human action, without any particular values for any context attributes.

In summary, as illustrated at FIG. 3(a), the user goes about his or her day, moving throughout the environment, interacting with various objects, and performing various other human actions. As illustrated at FIG. 3(b), the CAP authoring program 33 records values of the context attributes synchronously with the human actions of the user and saves the values of the context attributes and the recorded human actions in a context database. The context database enables the user to subsequently search for human actions by specifying the values of context attributes. Next, as illustrated at FIG. 3(c), the user defines events as particular combinations of human actions and context attributes, and then creates a CAP by associating the defined events with IoT functions and/or other actions that are to be performed in response to the defined events. Additional temporal properties can be defined that further specify how the event is detected or responded to. Finally, as illustrated at FIG. 3(d), when the CAP is authored and deployed, the CAP authoring program 33 monitors the current context status (i.e., human motions and values of context attributes) and detects when the defined event has occurred. In response to detect that the event has occurred, the model outputs that the event has occurred and triggers the IoT functions and/or other actions that are to be performed.

Methods for Authoring Context-Aware Applications

Figure 4:
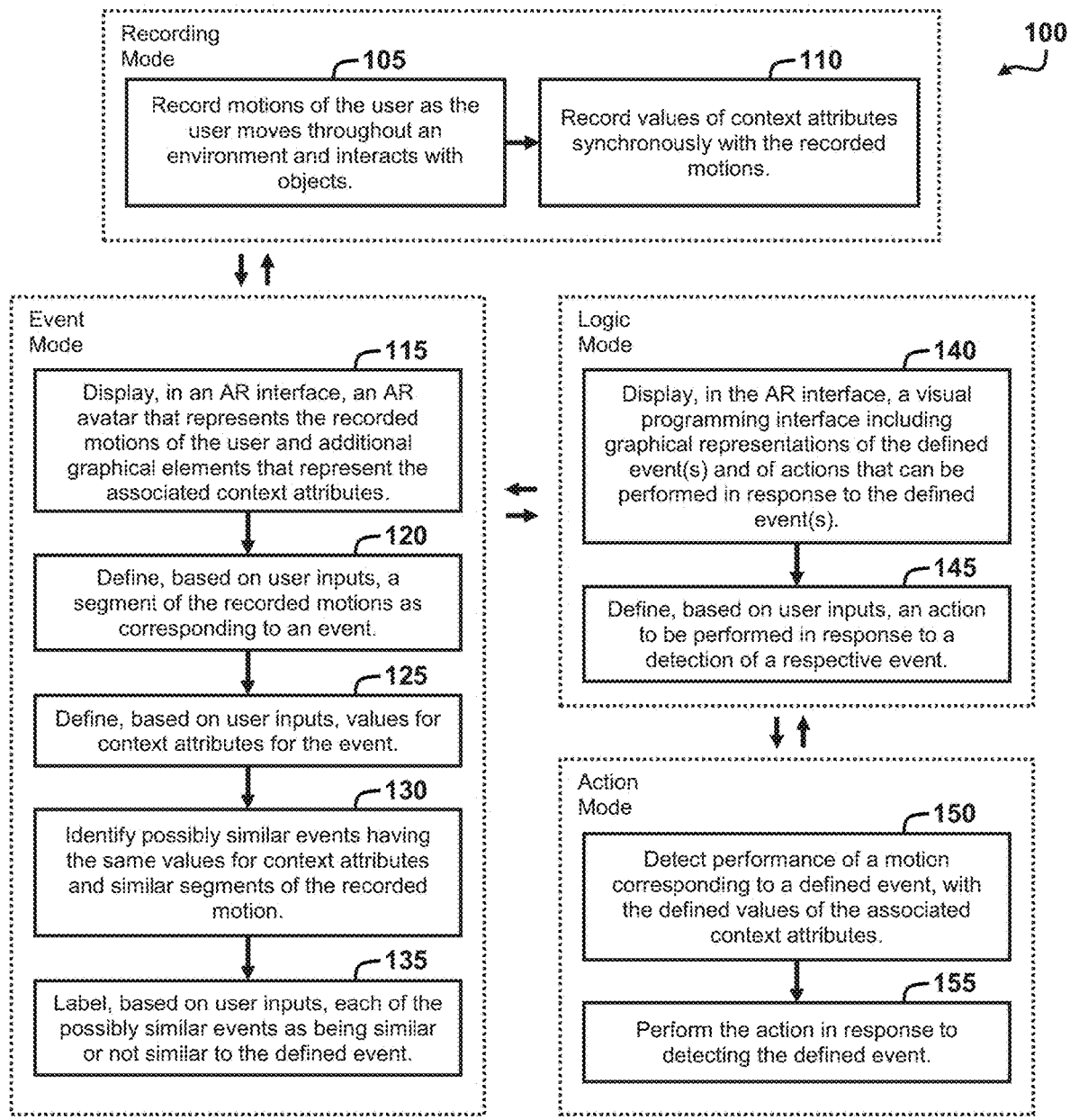
FIG. 4 shows a logical flow diagram for a method for operating the AR system to author and implement CAPs.

FIG. 4 shows a logical flow diagram for a method 100 for operating the AR system 20 to author and implement CAPs. In the performance of the method 100, the AR system 20 is configured to provide a variety of AR graphical user interfaces and interactions therewith which can be accessed in the following four modes of the AR system 20: Recording Mode, Event Mode, Logic Mode, and Action Mode. In the Recording Mode, the AR system 20 enables the user to record a human motion clip containing human actions, as well as synchronous values of one or more context attributes. In the Event Mode, the AR system 20 enables a user to visualize the human actions of the human motion clip and associated context attributes and define events corresponding to particular combinations of human actions and context attributes. In the Logic Mode, the AR system 20 enables the user to program a CAP in which one or more actions are performed in response to detecting the event. Finally, in the Action Mode, the AR system 20 detects occurrences of the event and performs the one or more actions in response to detecting the event.

A variety of methods, workflows, and processes are described below for enabling the operations and interactions of the Recording Mode, Event Mode, Logic Mode, and Action Mode of the AR system 20. In these descriptions, statements that a method, workflow, processor, and/or system is performing some task or function refers to a controller or processor (e.g., the processor 25) executing programmed instructions (e.g., the CAP authoring program 33, the AR graphics engine 34) stored in non-transitory computer readable storage media (e.g., the memory 26) operatively connected to the controller or processor to manipulate data or to operate one or more components in the CAP authoring system 10 to perform the task or function. Additionally, the steps of the methods may be performed in any feasible chronological order, regardless of the order shown in the figures or the order in which the steps are described.

Additionally, various AR graphical user interfaces are described for operating the AR system 20 in the Recording Mode, Event Mode, Logic Mode, and Action Mode. In many cases, the AR graphical user interfaces include graphical elements that are superimposed onto the user's view of the outside world or, in the case of a non-transparent display screen 28, superimposed on real-time images/video captured by the camera 29. In order to provide these AR graphical user interfaces, the processor 25 executes instructions of the AR graphics engine 34 to render these graphical elements and operates the display 28 to superimpose the graphical elements onto the user's view of the outside world or onto the real-time images/video of the outside world. In many cases, the graphical elements are rendered at a position that depends upon positional or orientation information received from any suitable combination of the external sensor 24, the sensors 30, the sensor 32, and the cameras 29A, 29B, so as to simulate the presence of the graphical elements in real-world the environment. However, it will be appreciated by those of ordinary skill in the art that, in many cases, an equivalent non-AR graphical user interface can also be used to operate the CAP authoring program 33, such as a user interface provided on a further computing device such as laptop computer, tablet computer, desktop computer, or a smartphone.

Moreover, various user interactions with the AR graphical user interfaces and with interactive graphical elements thereof are described. In order to provide these user interactions, the processor 25 may render interactive graphical elements in the AR graphical user interface, receive user inputs from, for example, the user interface 31 of the hand-controller 22 or via gestures performed in view of the one of the cameras 29A, 29B or other sensor, and execute instructions of the CAP authoring program 33 to perform some operation in response to the user inputs.

Finally, various forms of motion tracking are described in which spatial positions and motions of the user 15 or of other objects in the environment (e.g., the IoT devices or other objects) are tracked. In order to provide this tracking of spatial positions and motions, the processor 25 executes instructions of the CAP authoring program 33 to receive and process sensor data from any suitable combination of the external sensor 24, the sensors 30, the sensor 32, and the cameras 29A, 29B, and may optionally utilize visual and/or visual-inertial odometry methods such as simultaneous localization and mapping (SLAM) techniques.

Recording Mode: Recording Human Actions and Associated Context

With continued reference to FIG. 4, in the Recording Mode, the method 100 begins with recording motions of the user as the user moves throughout an environment and interacts with objects (block 105). Particularly, in the Recording Mode, AR system 20 records a human motion clip as the user goes about his or her day, moving throughout the environment, interacting with various objects, and performing various other human actions. Advantageously, the recording of the human motion clip is achieved through natural embodied movement, in which the AR system 20 tracks the position and orientation of the AR-HMD 23 and the hand-held controller(s) 22, or equivalently tracks the position and pose of the head, arms, and hands of the user. In particular, the processor 25 receives and processes sensor data from any suitable combination of the external sensor 24, the sensors 30, the sensor 32, and the cameras 29A, 29B, to determine and record a plurality of positions of the user's head, arms, and hands in the environment over a period of time, which collectively comprise the human motion clip. The processor 25 stores the recorded human motion clip in a context database in the memory 26.

In at least one embodiment, the resulting human motion clip is a time sequence of motion frames, which may be captured with a predetermined capture rate, e.g. 90 Hz. Each motion frame has position and/or orientation information of the user 15 at a respective point in time. Particularly, each motion frame may, for example, be in the form of a position vector, which specifies the position and/or orientation of one or more key points or joints of the user 15 at the respective point in time.

Figure 5:
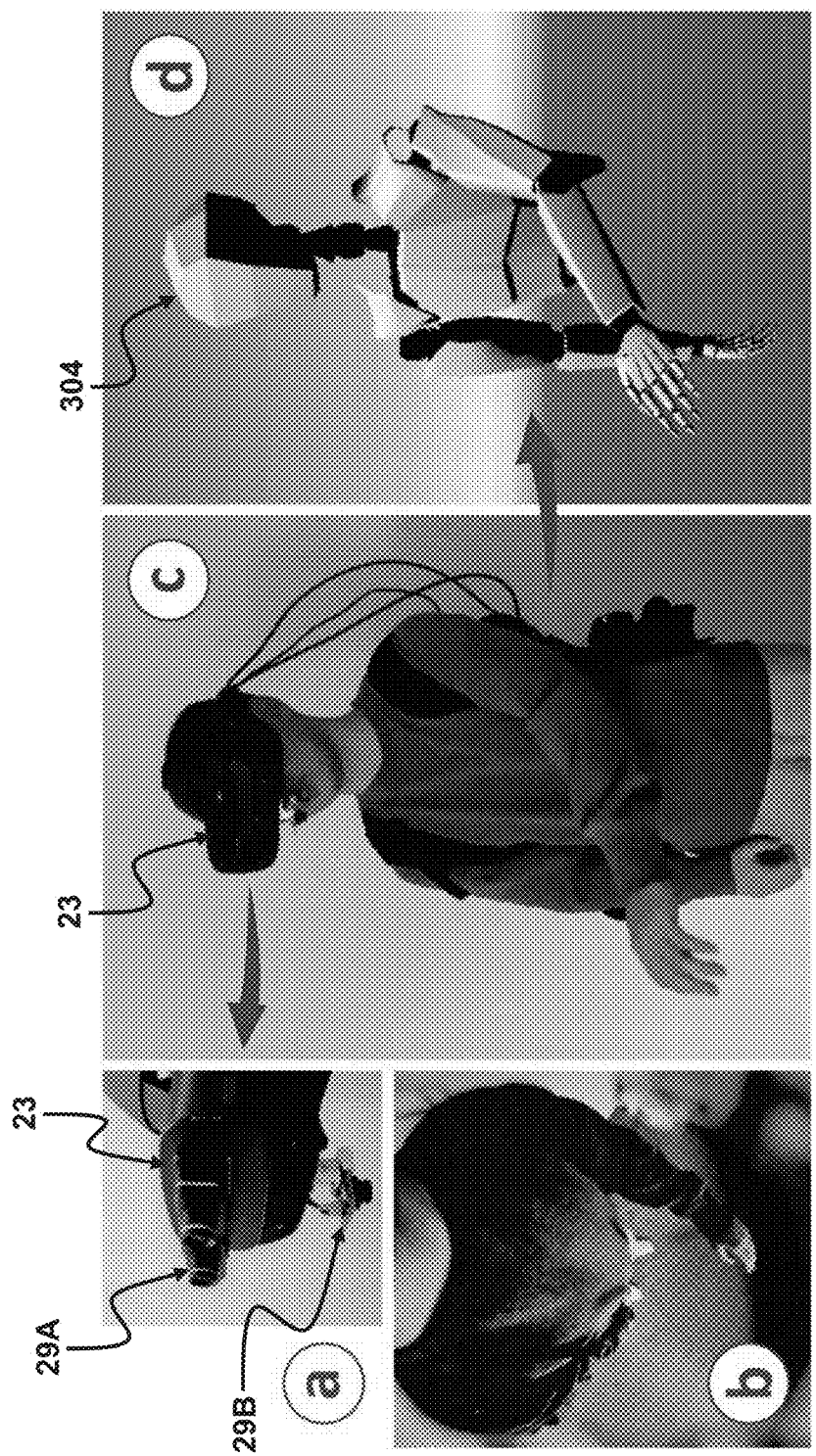
FIG. 5 shows the recording and reconstruction of human poses using the AR system.

As discussed above, the AR-HMD 23 has a front-facing stereo camera 29A and a downward-looking fisheye camera 29B. FIG. 5 shows the arrangement of the front-facing stereo camera 29A and a downward-looking fisheye camera 29B on the AR-HMD 23 at FIG. 5(a) and FIG. 5(c). In at least some embodiments, the processor 25 is configured to determine the position of the user 15 in the environment based on front-facing images received from the front-facing stereo camera 29A, for example using SLAM techniques. In contrast, the processor 25 is configured to determine the positions and orientations of the arms and hands (and possibly fingers, as well) of the user 15 based on the downward facing images, as shown at FIG. 5(b), of the arms and hands of the 15, for example using a pose-tracking algorithm.

Figure 6:
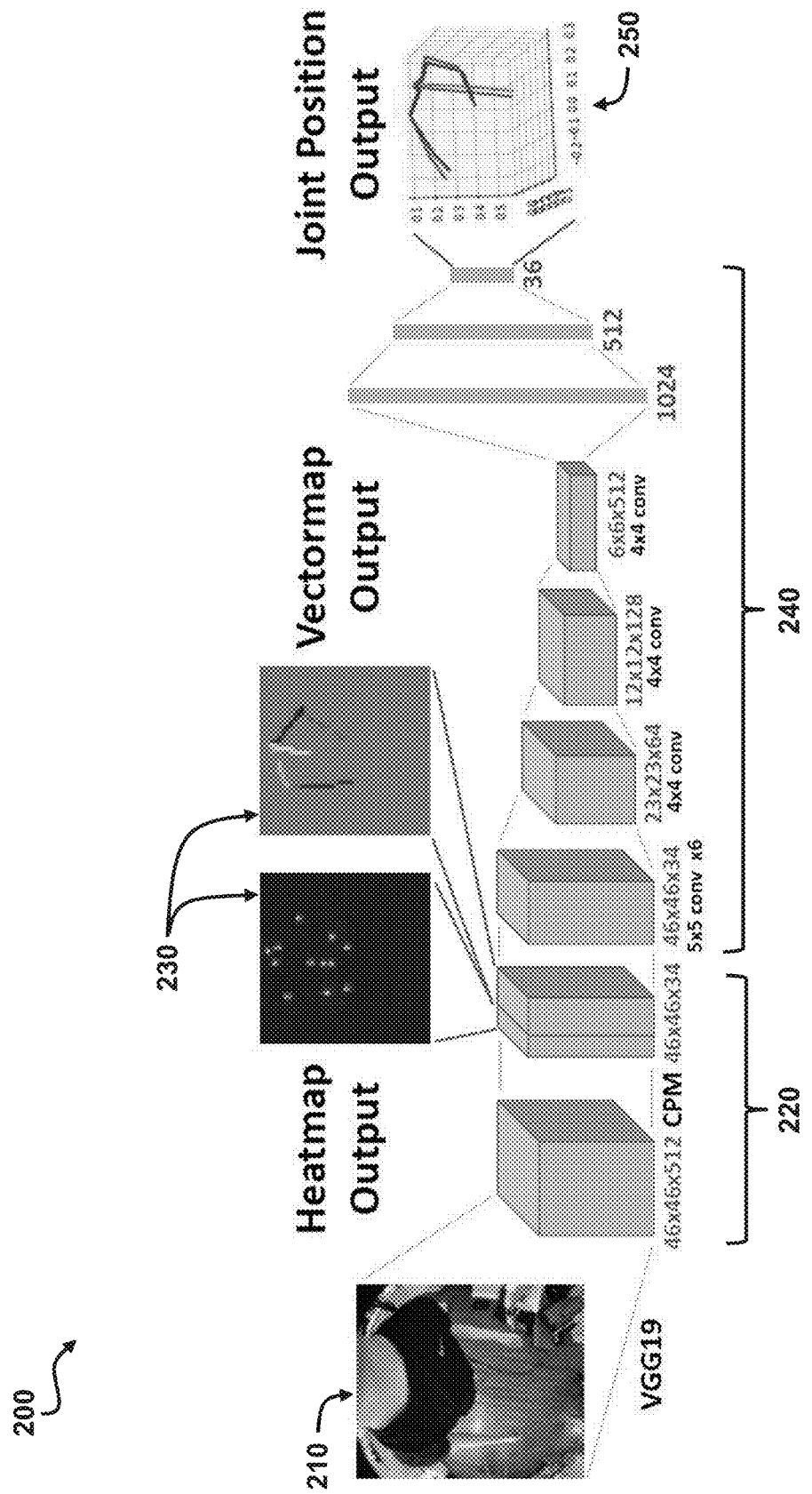
FIG. 6 shows an exemplary deep neural network for estimating the pose of the arms and hands of the user.

In some embodiments, the processor 25 is configured to utilize a machine learning model to perform pose tracking of the arms and hands of the user 15. Particularly, FIG. 6 shows an exemplary deep neural network 200 for estimating the pose of the arms and hands of the user 15 based on the downward facing images received from the camera 29B. The deep neural network 200 takes the form of a convolutional neural network (CNN). It will be appreciated by those of ordinary skill in the art that CNNs are a type of feed-forward neural network that contains a number of convolution layers or convolution operations. A convolution layer receives an input, and applies one or more convolutional filters to the input. Each convolutional filter, also referred to as a kernel, is a matrix of weights, also referred to as parameters or filter values, which is applied to various chunks of an input matrix in a defined manner such that the matrix of weights is convolved over the input matrix to provide an output matrix. Values for the matrix of weights are learned in a training process prior to operation of the CNN. The dimensions of the output matrix is determined by the kernel size of the filter (i.e., the size of the matrix of weights) and by the "stride" of the filter, which indicates how much the chunks of the input matrix overlap with one another or are spaced apart from one another during convolution. The various layers and filters of a CNN are used to detect or encode various "features" of the input.

The deep neural network 200 is configured to receive input data consisting of a photographic (RGB) image 210 captured by the downward-looking fisheye camera 29B. In the illustrated embodiment, the deep neural network 200 has a feed-forward structure comprising two concatenated parts. First, the deep neural network 200 includes a convolutional pose machine (CPM) 220 (e.g., OpenPose with VGG19 backbone) comprised of a sequence of convolutional layers configured to detect 2D locations and orientations of joints in the photographic images 210. The CPM 220 determines intermediate outputs 230 in the form of a 2D heat map and a 2D vector map. Second, the deep neural network 200 includes convolutional neural network 240 comprised of a sequence of convolutional layers configured to determine the 3D joint positions 250 from the 2D intermediate outputs 230. In at least one embodiment, CPM 220 and the CNN 240 are trained separately.

Returning to FIG. 4, in the Recording Mode, the method 100 continues with recording values of context attributes synchronously with the recorded motions (block 110). Particularly, in the Recording Mode, the AR system 20 records values for one or more context attributes synchronously with the recording of the human motion clip. In particular, the processor 25 receives and processes sensor data from any suitable combination of the external sensor 24, the sensors 30, the sensor 32, and the cameras 29A, 29B, to determine and record a plurality of values for one or more context attributes. As discussed above, the context attributes may, for example, include (1) objects that are being interacted with by the user 15 during the human motion clip, (2) spatial locations of the user 15 during the human motion clip, (3) times of day during the human motion clip, and (4) positions, orientations, and states (e.g., an on/off state) of certain objects during the human motion clip. However, the context attributes may include any other additional contextual and/or environmental information (e.g., temperature, weather, weather forecast, lighting, humidity, day of the week, month, etc.). The processor 25 stores the recorded values for the one or more context attributes in the context database in the memory 26.

The spatial locations of the user 15 are, of course, already captured by the positional data of the human motion clip. Likewise, the times of day are captured by timestamps of the data of the human motion clip. However, with respect to the interactions with objects, as well as the positions, orientations, and states of the objects, the AR system 20 records values for the context attributes separately from the human motion clip and in a synchronous manner with the recording of the human motion clip.

In at least some embodiments, the AR system 20 employs an object detection algorithm to track 3D positions and/or orientations of objects in the environment of the user 15. Particularly, the processor 25 is configured receive data from any suitable combination of the external sensor 24, the sensors 30, the sensor 32, and the cameras 29A, 29B and, using the object detection algorithm, determine the 3D positions and/or orientations of objects in the environment of the user 15. In one embodiment, the processor 25 determines the 3D positions and/or orientations of objects using a real-time object detection algorithm (e.g., YOLO v3) that receives the photometric (RGB) images from the front-facing stereo camera 29A and determines 2D positions of the objects in the photometric images. Next, the processor 25 reprojects the 2D positions back into 3D using the depth image from the front-facing stereo camera 29A. The processor 25 determines the 3D position of an object to remain stable while the object is out of the field of view of the front-facing stereo camera 29A.

In order to detect interactions with the objects, the processor 25 compares the determined positions of the objects with the recorded positions of the hands of the user 15. If the position of an object is within a predetermined threshold distance (e.g., 10 cm) from a hand of the user 15, the processor 25 records that the user 15 is interacting with the object. In some embodiments, predetermined threshold distance depends on a size of the object. For example, small objects may require a relatively smaller threshold distance compared with large objects for an interaction to be detected.

Additionally, as noted above, at least some of the objects in the environment may be IoT devices. In some embodiments, the processor 25 is configured to record the states of the various IoT devices over time as context attributes. These IoT devices may, for example, include sensors, actuators, appliances, and other smart devices and generally have some kind of state that is variable over time. Referring back to the example of FIG. 1, the kettle 17 is an exemplary IoT device which has "states" including, for example, an on/off state and an operating state (idle, heating, or heated). As another example, a smart thermostat may include sensors that report an ambient temperature and actuators that operate an HVAC system to maintain a target ambient temperature. In this example, the sensed ambient temperature, the target ambient temperature, and an on/off state or operating state of the HVAC system can be considered "states" of the smart thermostat.

In some embodiments, the processor 25 is further configured to record abstract states or values for various non-smart objects over time as context attributes. For example, a pill bottle object may be present in the environment and may be interacted with by the user 15. An abstract "pill count" value can be maintained for the pill bottle object. As will be described in detail below, such abstract values for non-smart objects are adjustable as an action performed in response to detecting an event, rather being sensed or otherwise detected as with other context attributes.

Finally, the user is provided with an AR graphical user interface on the display screen 28 of the AR system 20, which enables the user to, for example, start and stop the recording of the human motion clip and associated context attributes, save the human motion clip and associated context attributes, delete the human motion clip and associated context attributes, or re-record the human motion clip and associated context attributes. Once human motion clip and associated context attributes are recorded and saved, the AR system 20 can begin operation in the Event Mode, from which the user 15 can begin the CAP authoring process.

Event Mode: Defining Triggering Events

With continued references to FIG. 4, in the Event Mode, the method 100 continues with displaying, in an AR interface, an AR avatar that represents the recorded motions of the user and additional graphical elements that represent the associated context attributes (block 115). Particularly, in the Event Mode, the AR system 20 displays, in the AR graphical user interface on the display 28, graphical representations of the recorded human motion clip and the synchronous values of the one or more context attributes. The graphical representations of the recorded human motion clip and the synchronous values of the one or more context attributes are superimposed on the environment such that they provide a time-space reference for the recorded human motion clip and the synchronous values of the one or more context attributes. The AR graphical user interface enables the user to define events by selecting segments of the recorded human motion clip that define human actions that correspond to the event and selecting values of the one or more context attributes that correspond to the event.

Figure 7:
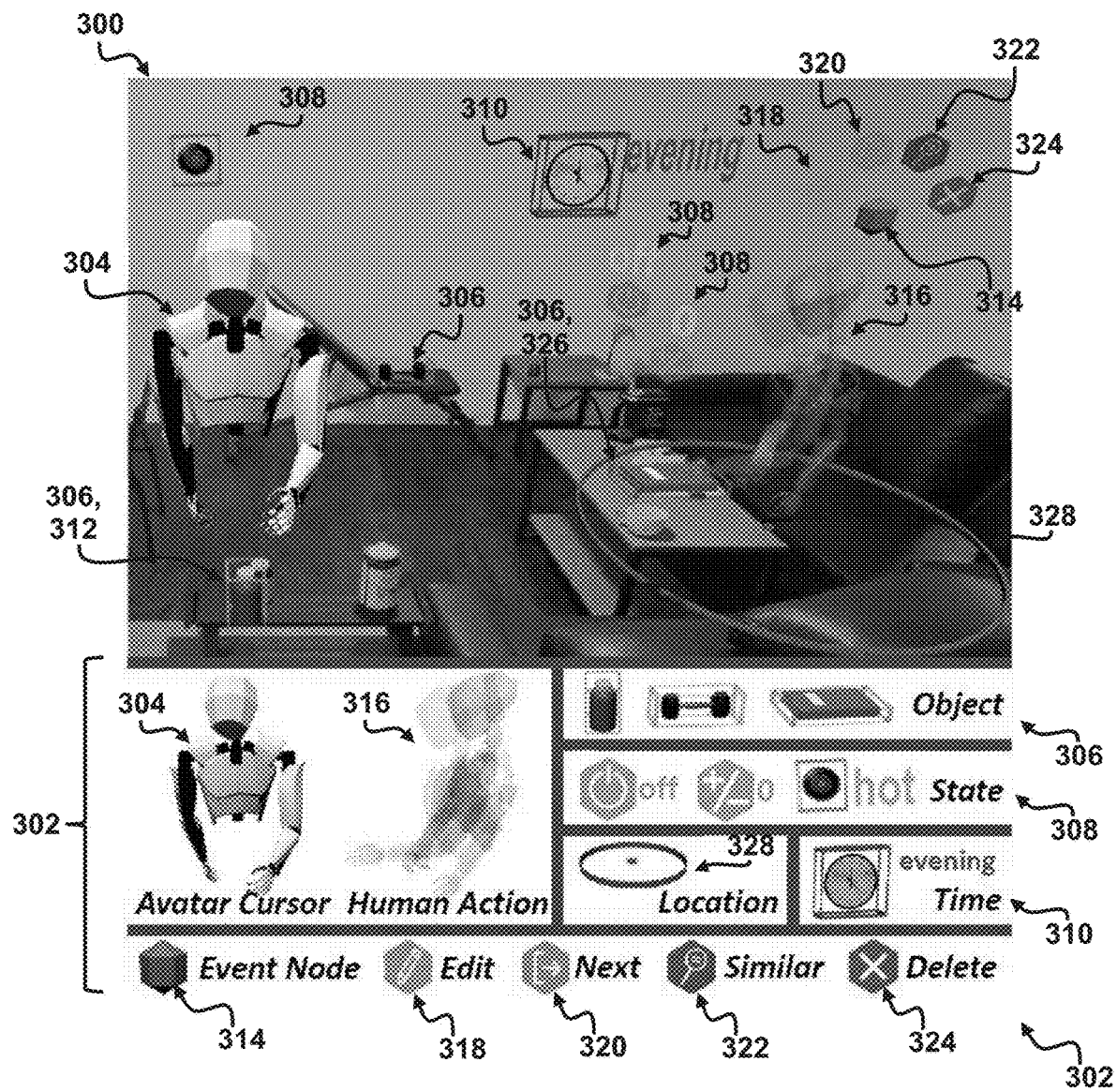
FIG. 7 shows an exemplary AR graphical user interface displayed by the AR system in an Event Mode.

FIG. 7 shows an exemplary AR graphical user interface 300 displayed by the AR system 20 in the Event Mode and corresponding a legend 302 describing the graphical elements thereof. The AR graphical user interface 300 includes a variety of graphical elements that enable the user 15 to easily visualize the recorded human motion clip and the synchronous values of the one or more context attributes, and to define events.

First, the AR graphical user interface 300 includes an avatar cursor 304. The avatar cursor 304 is a graphical representation of the recorded human motion clip at a particular snapshot in time. Particularly, in the illustrated embodiment, avatar cursor 304 comprises a humanoid AR avatar superimposed upon the environment according to the position of the user 15 at a particular time during recorded human motion clip and has a torso and arms that are posed according to a pose of the user 15 at the particular time during recorded human motion clip. The processor 25 converts the head position and joint positions of the recorded human motion clip into the avatar cursor 304 (as shown in FIG. 5(*c*)-(*d*)), for example, using a plugin of the AR graphics engine 34 (e.g., the FinalIK Unity3D plugin).

The AR graphical user interface 300 enables the user to move the avatar cursor 304 temporally to "scrub" through the recorded human motion clip. Particularly, based on user inputs received from the user 15 via the hand-held controller(s) 22 or other user interface, the processor 25 moves, updates, and/or animates the AR graphical user interface 300 such that the avatar cursor 304 represents poses of the user 15 in the recorded human motion clip at different particular snapshots in time. In this way, the avatar cursor 304 enables the user 15 to conveniently browse, manipulate, and select different portions of recorded actions.

Second, the AR graphical user interface 300 includes a variety of graphical elements representing the recorded values of the one or more context attributes. Particularly, in some embodiments, the AR graphical user interface 300 includes virtual objects 306 that represent the positions and/or states of various objects of interest (e.g., a pill bottle, a dumbbell, and a book) in the environment during the recorded human motion clip. The virtual objects 306 are designed to virtually represent the corresponding real-world object and are superimposed upon their current position in the environment. If the user 15 interacted with a particular object at the time selected by the avatar cursor 304, then the virtual object 306 is animated to move with the hands of the avatar cursor 304 during the interaction. In this way, interactions with the objects during the recorded human motion clip are represented.

Additionally, in some embodiments, the AR graphical user interface 300 includes state identifiers 308 that represent the state of various objects of interest (e.g., an on/off status of a smart lamp, a pill count of a pill bottle, heating time for a kettle, or an operating state of a smart thermostat) in the environment during the recorded human motion clip. As noted above, these states can be states (e.g., an operating state) of an IoT device or abstract states or values of a non-smart object (e.g., the pill count of the pill bottle. The state identifiers 308 may comprise icons, text, or other graphical elements that represent the current state of the object at the time selected by the avatar cursor 304 and which are superimposed next to or above the associated object in the environment.

Finally, in some embodiments, the AR graphical user interface 300 includes additional context identifiers 310 that indicate values for any other context attribute. The additional context identifiers 310 may comprise icons, text, or other graphical elements that represent values of various context attributes at the time selected by the avatar cursor 304 and which are superimposed in the environment. For example, in the illustrated embodiment of FIG. 7, the AR graphical user interface 300 includes an additional context identifiers 310 in the form of a virtual clock icon with corresponding text indicating a time of day (e.g., "evening") at the time selected by the avatar cursor 304.

Returning to FIG. 4, in the Event Mode, the method 100 continues with defining, based on user inputs, a segment of the recorded motions as corresponding to an event (block 120). Particularly, in the Event Mode, the AR system 20 enables the user 15 to define one or more events. Each event is defined, at least in part, by a particular human action. By interacting with the AR graphical user interface, the user can select segment(s) of the recorded motion clip that correspond to the human action of an event. Particularly, based on user inputs received from the user 15 that move the avatar cursor 304 from a start time of the human action to an end time of the human action, the processor 25 identifies a respective segment of the recorded motion clip as corresponding to the human action of an event. With reference to the example of FIG. 1, the event was defined to include the "picking up" human action in which the user 15 picks up an object with his or her hands.

With reference to the AR graphical user interface 300 of FIG. 7, the user 15 selects each segment of the recorded motion clip as corresponding to a human action by moving or "scrubbing" the avatar cursor 304 in a hold-and-drag manner (similarly to clicking and dragging with mouse of a personal computer), for example by tilting a joystick of the hand-held controller 22 to move the avatar cursor 304 while holding a button of the hand-held controller 22. The user 15 moves the avatar cursor 304 from the pose at a start time of the human action to the pose at an end time of the human action. In some embodiments, the user 15 can perform this selection multiple times to identify multiple instances of the same human action that defines the event.

In some embodiments, the AR graphical user interface 300 includes a suggestion feature that enables the user to quickly navigate the avatar cursor 304 to particular times of interest within the recorded human motion clip by selecting values of the one or more context attributes as filters. Particularly, by interacting with the AR graphical user interface 300, the user 15 selects value(s) for one or more context attributes. In response to the user 15 selecting the value(s) for the one or more context attributes, the processor 25 updates and/or moves the avatar cursor 304 to represent a position and pose of the user 15 at a time in the recorded human motion clip at which the one or more context attributes had the selected value(s).

In the example of FIG. 7, the user selects the pill bottle 312 to indicate that he or she is interested in human action in which the pill bottle 312 was interacted with (i.e., when the pill bottle interaction context attribute was 'true'). In response to the selection, the avatar cursor 304 is navigated to a time at which the user 15 interacted with the pill bottle 312. Additionally, the graphical elements representing the selected context attribute may be highlighted or changed in color to indicate the selection. The user 15 can similarly select values for any other context attribute in this manner, such as a value of a state of an IoT device or a time of day. Furthermore, the user 15 can select values for multiple context attributes. For instance, a user 15 can further select "morning" as a value of the time of day context attribute to find the instances in the human motion clip at which the user 15 interacted with the pill bottle in the morning. In this way, the suggestion feature advantageously eases the burden of navigating and reviewing very long human motion clips.

Once a particular human action has been identified as corresponding to the event, the event has been at least partially defined. With continued reference to FIG. 7, each defined event is notated in the AR graphical user interface 300 with an event node icon 314 superimposed in the environment next to a location at which the defined human action was performed. Additionally, the AR graphical user interface 300 includes an AR ghost 316 representing the motions of the defined human action of the event, which is superimposed in the environment at the location at which the defined human action was performed. With reference to the illustrated example of FIG. 7, the user 15 has defined a "picking up" human action in which the user performs the motions of picking up an object (i.e., the pill bottle 312). In one embodiment, the AR ghost 316 consists of multiple semi-translucent AR avatars representing multiple poses during the motions of the defined human action. In one embodiment, in response to the user 15 pointing at or otherwise selecting the event node icon 314, the AR ghost 316 animates repeatedly to illustrate the motions of the defined human action.

Finally, the AR graphical user interface 300 includes a set of controls for navigating the features of the Event Mode. Particularly, in the illustrated embodiment, the AR graphical user interface 300 includes an "Edit" button 318, a "Next" button 320, a "Similar" button 322, and a "Delete" button 324. In response to the user 15 pointing at or otherwise selecting the "Edit" button 318, the AR graphical user interface 300 enables the user 15 to edit the selected event. In response to the user 15 pointing at or otherwise selecting the "Next" button 320, the AR graphical user interface 300 enables the user 15 to view another previously defined event and/or begin defining a new event. In response to the user 15 pointing at or otherwise selecting the "Similar" button 322, the AR graphical user interface 300 enables the user 15 to view and label similar human motions to the defined human action of the event (discussed in greater detail below with respect to block 130 and 135 of FIG. 4). In response to the user 15 pointing at or otherwise selecting the "Delete" button 322, the AR graphical user interface 300 enables the user 15 to delete the selected event.

In the Event Mode, the method 100 continues with defining, based on user inputs, values for context attributes for the event (block 125). Particularly, in the Event Mode, the AR system 20 enables the user 15 to define values for one or more context attributes for an event. As mentioned above, each event is defined, at least in part, by a human action. However, since similar human actions may occur in a variety of different contexts from which different meanings might be inferred, an event can advantageously be defined to require particular values or ranges of values for one or more context attributes. By interacting with the AR graphical user interface, the user can select a value or range of values for one or more context attributes that further define an event. With reference to the example of FIG. 1, the event was defined to include the "picking up" human action combined with two context attributes of (i) the "cup" object interaction attribute and (ii) the "morning" time of day attribute.

Returning to FIG. 7, in one embodiment, the user 15 interacts with the AR graphical user interface 300 to select one of the virtual objects 306 to indicate that the event should involve an interaction with the selected object. With reference to the illustrated example of FIG. 7, the user 15 has selected the book 326 to indicate that the selected event must involve an interaction with book 326. In another embodiment, the user 15 interacts with the AR graphical user interface 300 to select a time of day for the event (e.g., a range of times of day). In the example of FIG. 7, the user 15 has selected the time of day context identifier 310 and defined an "evening" value for the time of day context attribute for the event. In yet another embodiment, the user 15 interacts with the AR graphical user interface 300 to select a state context attribute for an IoT device or other non-smart object for the event (e.g., an on/off state of the lamp or a pill count for the pill bottle). Finally, one some embodiments, the user 15 interacts with the AR graphical user interface 300 to define a location or range of locations at which the human action should occur for the event. In the example of FIG. 7, the user 15 has selected a location near a sofa. The AR graphical user interface 300 includes a location identifier 328 in the form of a circle that identifies a range of locations for the location context attribute In at least one embodiment, when editing a particular event, the AR graphical user interface 300 highlights all of the graphical elements corresponding to the selected context attributes for the event with a first color (e.g., pink). Conversely, the AR graphical user interface 300 highlights all of the graphical elements corresponding to the context attributes that are not selected for the event with a default second color (e.g., blue). If the user 15 selects the event node icon 314 for another previously defined event, the AR graphical user interface 300 resets the highlighting to the default second color.

In the Event Mode, the method 100 continues with identifying possibly similar events having the same values for context attributes and similar segments of the recorded motion (block 130). Particularly, in the Event Mode, the AR system 20 enables the user 15 to quickly identify instances of human motion in the human motion clip that are similar to the defined human action for an event. As mentioned above, each event is defined by a human action and values for one or more context attributes. The processor 25 is configured to identify additional segments of human motion in the human motion clip that are similar to the defined human action for the event.

In at least one embodiment, the processor 25 identifies the additional similar segments of the human motion clip by comparing the sequence of poses of the defined human action with sequences of poses from candidate portions of the human motion clip at different times. In one embodiment, the processor 25 uses Dynamic Time Warping (DTW) to calculate the similarity (i.e., a distance) between the sequence of poses of the defined human action and the other candidate portions of the human motion clip. It will be appreciated by those of ordinary skill in the art that DTW is an algorithm to find the alignment between two time series data. If the difference or DTW distance between a candidate portion of the human motion clip and the defined human action of the event is less than a predetermined threshold, the processor 25 determines that the candidate portion of the human motion clip may be a similar human action. Next, if a candidate portion of the human motion clip also occurred with the same defined values for the one or more context attributes of the event, then the processor 25 determines that it is a similar human action to the defined human action of the event. Thus, the similar human actions are segments of the human motion clip that have the same context attributes as the defined event and similar human motions as the defined event.

In the Event Mode, the method 100 continues with labeling, based on user inputs, each of the possibly similar events as being similar or not similar to the defined event (block 135). Particularly, in the Event Mode, the AR system 20 enables the user 15 to review instances of similar human actions with respect to the defined human action for an event. For each respective similar human action that was identified, the processor 25 moves, updates, and/or animates the AR graphical user interface to include a graphical representation of the poses and/or human motions of the identified similar human actions (e.g., an animation of the avatar cursor 304). Based on user inputs received from the user 15, the processor 25 labels each of the similar human actions as either (1) corresponding to an additional occurrence of the event, i.e. a true-positive example, or (2) not corresponding to an additional occurrence of the event, i.e. a false-positive example.

As mentioned above, in response to the user 15 pointing at or otherwise selecting the "Similar" button 322, the AR graphical user interface 300 enables the user 15 to view and label similar human motions to the defined human action of the event. With respect to the example of FIG. 7, the user 15 may press the "Similar" button 322 to review similar human actions in which the user picks up the book in the evening to read. Some of the similar human actions will be other instances in which the user picked up the book in the evening to read (i.e., true-positive examples). However, some of the similar human actions may be false-positive examples and the user 15 can label them as such (e.g., a similar occurrence in which the user 15 picked up the book only to move it, rather than to read it).

This process advantageously helps the user 15 to debug their authored event and specify more detailed context attribute information for the event, if necessary. Moreover, as will be discussed in further detail below, these true-positive and false-positive examples of similar human actions are utilized to improve the detection accuracy for the defined event.

Logic Mode: Programming Context-Aware Applications

In the Logic Mode, the method 100 continues with displaying, in the AR interface, a visual programming interface including graphical representations of the defined event(s) and of actions that can be performed in response to the defined event(s) (block 140). Particularly, in the Logic Mode, the AR system 20 enables the user 15 to program actions or operations that are to be performed in response to the defined events using a visual programming interface within the AR graphical user interface. In the Logic Mode, the AR graphical user interface includes graphical depictions of the defined events, similar to those discussed above with respect to the Event Mode. Additionally, the AR graphical user interface further includes graphical elements representing various actions or operations that can be performed in response to the defined events.

Figure 8:
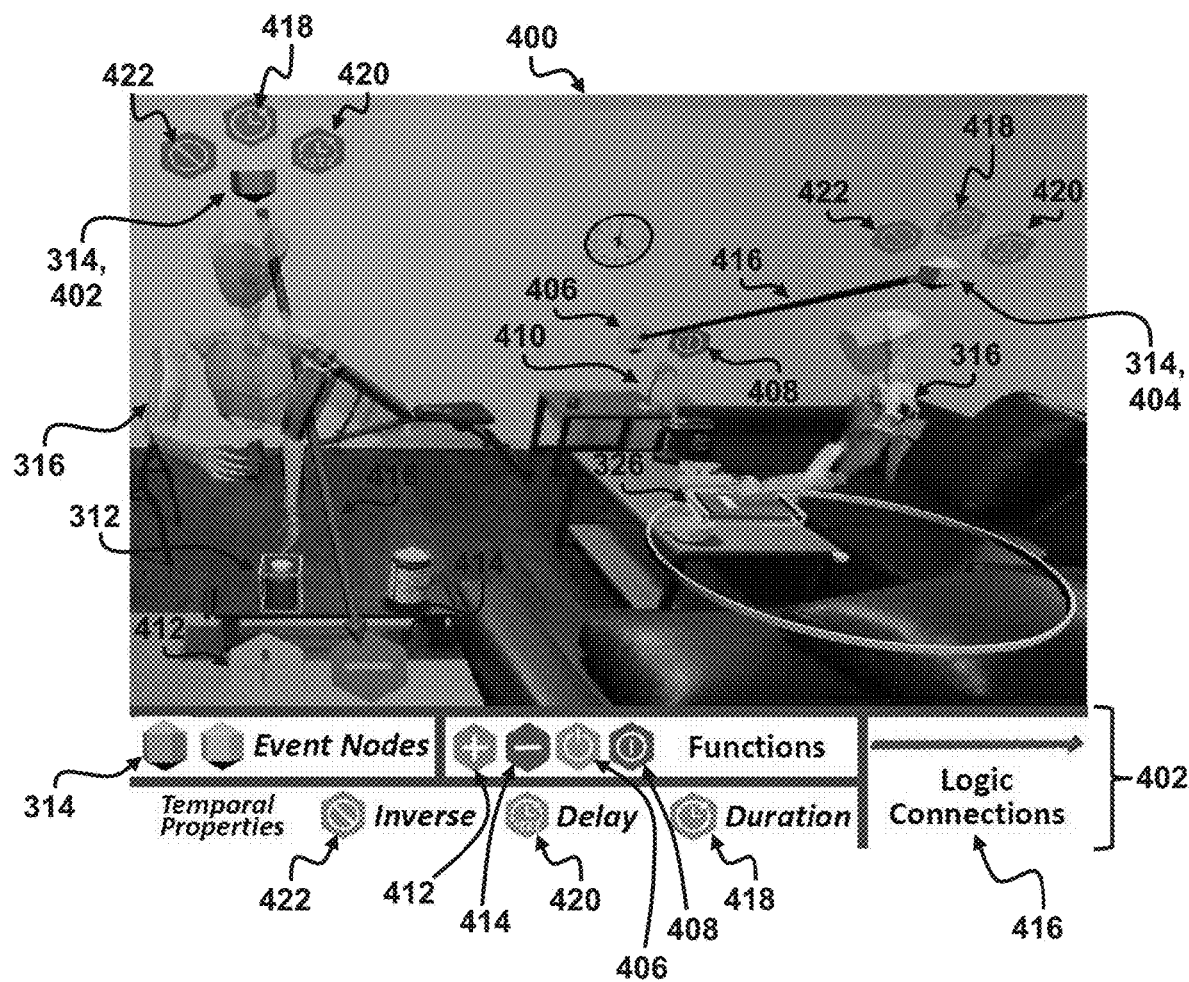
FIG. 8 shows an exemplary AR graphical user interface displayed by the AR system in a Logic Mode.

FIG. 8 shows an exemplary AR graphical user interface 400 displayed by the AR system 20 in the Logic Mode and corresponding a legend 402 describing the graphical elements thereof. The AR graphical user interface 400 provides a visual programming interface that enables the user 15 to program actions or operations that are to be performed in response to the user-defined events. Much like the AR graphical user interface 300, the AR graphical user interface 400 includes event node icons 314 and associated AR ghosts 316 representing the human actions of each previously defined event. In the illustrated example of FIG. 8, a first event 402 has been defined in which the user picks up the pill bottle 312 (to take a pill from the pill bottle). Additionally, a second event 404 has been defined in which the user picks up the book 326 near a sofa (to read the book).

Additionally, the AR graphical user interface 400 further includes function icons that represent different actions or operations that can be performed in response to the defined events. In the example of FIG. 8, the AR graphical user interface 400 includes a "power on" IoT function icon 406 and a "power off" IoT function icon 408 representing IoT functions of an IoT lamp 410, which control the power state of the IoT lamp 410. Additionally, in the example of FIG. 8, the AR graphical user interface 400 includes a "add to pill count" abstract function icon 412 and a "subtract from pill count" abstract function icon 414 representing abstract functions of the non-smart pill bottle 312, which modify the abstract "pill count" context attribute associated with the pill bottle 312.

In the Logic Mode, the method 100 continues with defining, based on user inputs, an action to be performed in response to a detection of a respective event (block 145). Particularly, as noted above, in the Logic Mode, the AR system 20 enables the user 15 to program actions or operations that are to be performed in response to the defined events using a visual programming interface within the AR graphical user interface. To this end, the user 15 can create logic connections between events and actions to define the actions that are to be performed in response to the defined events, thereby authoring a rule-based CAP (context-aware application). In particular, based on user inputs received from the user 15, the processor 25 defines associations between the previously defined events and actions that are to be performed in response to the defined events. With reference to the example of FIG. 1, the user authored the CAP by creating a logic connection between the previously defined event and an IoT function of the kettle 17.

Returning to FIG. 8, the AR graphical user interface 400 further includes logic connection arrows 416 that graphically represent the logic connections that have been created by the user. The user 15 can create the logic connections by interacting with the AR graphical user interface 400 using the hand-held controller 22 or otherwise to connect an event node icon 314 with one of the functions icons 406, 408, 412, 414. By doing so, the user 15 authors a rule-based CAP in which the function is performed in response to detecting the event. In some embodiments, the user 15 can logically connect one event node 314 to another event node 314 to implement a sequential logic for the CAP. Likewise, in some embodiments, the user 15 can logically connect multiple event nodes to one function to implement a parallel logic for the CAP.

In some embodiments, the user 15 can define a logic connection between an event and an IoT function. Particularly, in the example of FIG. 8, by interacting with the AR graphical user interface 400, the user 15 has defined a logic connection between the second event 404 and the "power on" IoT function of the IoT lamp 410. This logic connection is graphically represented by a logic connection arrow 416 between the event node icon 314 for the second event 404 and the "power on" IoT function icon 406. In this way, the user 15 has authored a CAP in which the IoT lamp 410 is turned on in response the user 15 user picking up the book 326 near the sofa (to read the book).

In some embodiments, the user 15 can define a logic connection between an event and an abstract context function. Particularly, in the example of FIG. 8, by interacting with the AR graphical user interface 400, the user 15 has defined a logic connection between the first event 402 and the "subtract from pill count" abstract function. This logic connection is graphically represented by a logic connection arrow 416 between the event node icon 314 for the first event 402 and the "subtract from pill count" abstract function icon 414. In this way, the user 15 has authored a CAP in which the abstract "pill count" context attribute of the pill bottle 312 is reduced by one in response the user 15 picking up the pill bottle 312 (to take a pill from the pill bottle).

Figure 9:
FIG. 9 illustrates some exemplary CAPs in which non-smart objects are augmented with contextual and other useful text information.

In some embodiments, the user 15 can define a logic connection between an event and an object function that includes displaying text above an object in the environment. Particularly, FIG. 9 illustrates some exemplary CAPs in which non-smart objects are augmented with contextual and other useful text information. In FIG. 9(a), an AR timer (e.g., "04:21") is displayed above a kettle to indicate an amount of time remaining to heat water in the kettle, in response to the user turning on the kettle. In FIG. 9(b), abstract context attribute information (e.g., "Pill Left −1") is displayed above a pill bottle to indicate an adjustment to the value of the abstract "pill count" context attribute of the pill bottle, in response to the user taking a pill from the pill bottle. In FIG. 9(c), reminder information (e.g., "Please wipe the table.") is displayed above a wipe bottle to remind the user to wipe off a table, in response the user getting up from the table.

Figure 10:
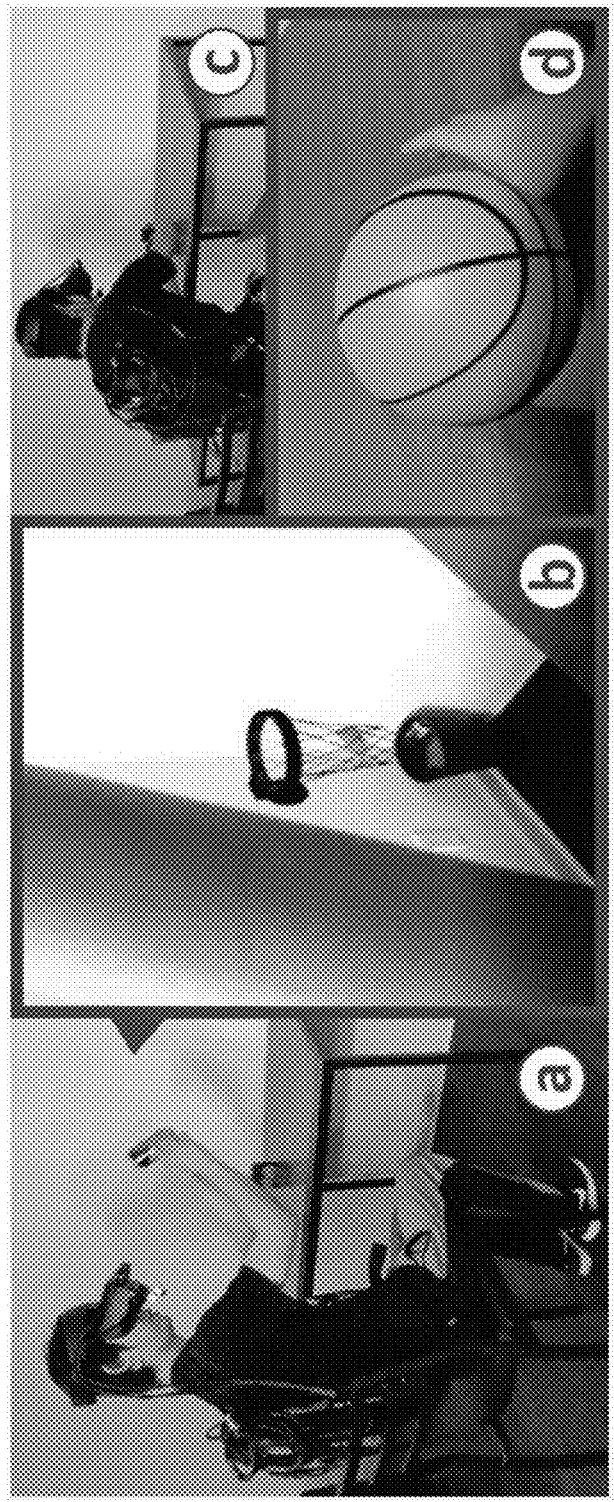
FIG. 10 illustrates an exemplary CAP in which graphics are overlaid atop objects in the environment to make an AR game.

In some embodiments, the user 15 can define a logic connection between an event and an object function that overlays graphics (e.g., a virtual object) atop the object in the environment. Particularly, FIG. 10 illustrates an exemplary CAP in which graphics are overlaid atop objects in the environment to make an AR game. In response to the user picking up an empty soda can (FIG. 10(c)), a virtual basketball is overlaid upon the empty soda can (FIG. 10(d)) and a virtual basket is overlaid upon a trash can (FIG. 10(b)). Thus, the user has authored a CAP that simulates a basketball shooting game in which the user 15 throws (FIG. 10(a)) the virtual basketball and/or empty soda can into the virtual basket and/or trash can.

Figure 11:
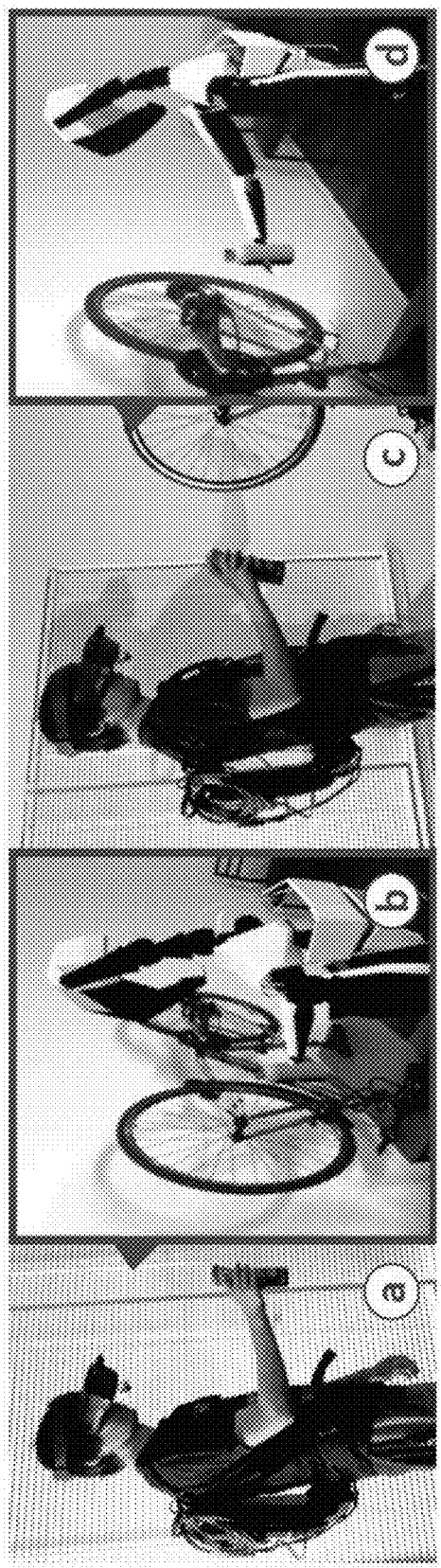
FIG. 11 illustrates an exemplary CAP for guiding a user to perform a sequential task involving multiple human actions.

In some embodiments, the user 15 can define a logic connection between an event and another event. For example, when a first event node is logically connected to second event node, this authors in a CAP in which, in response to detecting the first event, an AR avatar is animated to show a performance of the second event or text is displayed to describe the second event. Particularly, FIG. 11 illustrates an exemplary CAP for guiding a user to perform a sequential task involving multiple human actions. In the example, the CAP is used to demonstrate a routine task of repairing a bike, and in CAP incorporates three sequentially connected events: shaking the lubricant (FIG. 11(a)), spreading it on the front wheel (FIG. 11(b)), and then on the back wheel (FIG. 11(d)). When the system 10 detects that the user has completed a step (i.e., one of the sequential events), an animated AR avatar (FIGS. 11(b) and 11(d)) is shown in the AR graphical user interface to demonstrate the next step (i.e., the next sequential event).

Returning to FIG. 8, the AR graphical user interface 400 includes a set of controls for attaching temporal properties to the previously defined events, which modify the manner in which the events are detected or responded to. If the user 15 selects the "duration" temporal property icon 418 by interacting with the AR graphical user interface 400, then the event must occur for a user-specified duration of time before it is detected by the system 10. Additionally, if the user 15 selects the "delay" temporal property icon 420 by interacting with the AR graphical user interface 400, then the action performed in response to detecting the event will occur after a user-specified time delay. Finally, if the user 15 selects the "inverse" temporal property icon 422 by interacting with the AR graphical user interface 400, then the responsive action is performed if the event is not detected. By adjusting these temporal properties, the user 15 is enabled to create more flexible rule-based CAPs.

Figure 12:
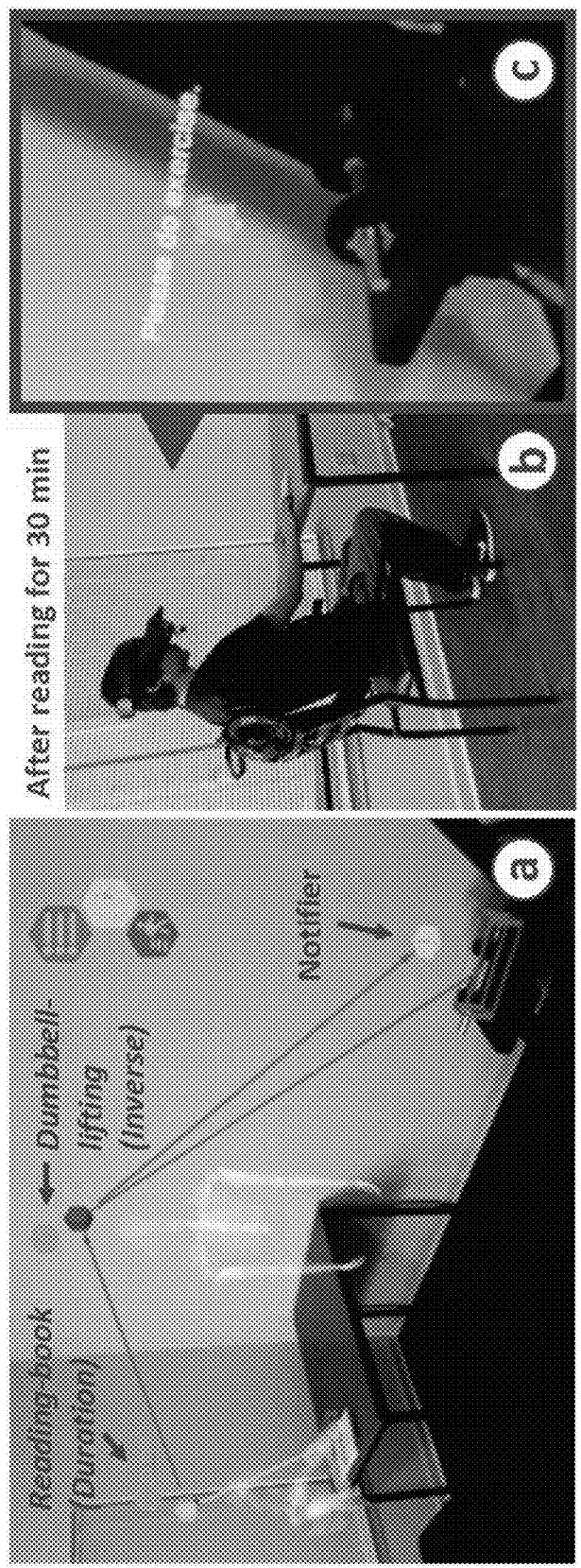
FIG. 12 illustrates an exemplary CAP for providing a healthy life reminder using multiple logic connections with temporal properties.

FIG. 12 illustrates an exemplary CAP for providing a healthy life reminder using multiple logic connections with temporal properties. Particularly, the user has authored a CAP in which the user is reminded to do some dumbbell-lifting after 30 minutes of reading without any dumbbell-lifting. As shown in FIG. 12(a), a reading-book event is modified with a duration temporal property of 30 minutes. The reading-book event is logically connected to a dumbbell-lifting event with an inverse property. The dumbbell-lifting event is further logically connected to a reminder function on a dumbbell. Thus, if the user has read for 30 minutes (FIG. 12(b)), the system 10 checks if the user has done any dumbbell-lifting in the past 30 minutes. If no dumbbell-lifting is performed, a reminder will pop up over the dumbbell (FIG. 12(c)—"Please do exercise").

Action Mode: Executing Context-Aware Applications

Returning to FIG. 4, in the Action Mode, the method 100 continues with detecting performance of a motion corresponding to a defined event, with the defined values of the associated context attributes (block 150). Particularly, in the Action Mode, the AR system 20 enables the user 15 to deploy and execute the authored CAPs as the user 15 goes about his or her daily life. To this end, as the user 15 goes about his or her day, moving throughout the environment, interacting with various objects, and performing various other human actions, the AR system 20 is configured to detect performance of the user-defined events.

Much like in the Recording Mode, the AR system 20 monitors the real-time position and orientation of the AR-HMD 23 and the hand-held controller(s) 22, or equivalently tracks the real-time position and pose of the head, arms, and hands of the user 15. In particular, the processor 25 receives and processes sensor data from any suitable combination of the external sensor 24, the sensors 30, the sensor 32, and the cameras 29A, 29B, to determine a plurality of real-time positions and poses of the user's head, arms, and hands in the environment.

Likewise, much like in the Recording Mode, the AR system 20 monitors real-time values of the one or more context attributes synchronously with the monitoring of the real-time poses of the user 15. In particular, the processor 25 receives and processes sensor data from any suitable combination of the external sensor 24, the sensors 30, the sensor 32, and the cameras 29A, 29B, to determine a plurality of real-time values for the one or more context attributes.

The AR system 20 is configured to detect the performance of a particular user-defined event in response to detecting a performance of the human action of the event, while the associated context attributes have the defined values of the event. To this end, the processor 25 continuously compares the monitored position and orientation of the head, arms, and hands of the user with those of human action of the event and compares the monitored values of the associated context attributes with the defined values for the event.

More particularly, to detect the human action of the event, the processor 25 receives and processes a real-time sequence of poses of the user 15 based on the image data from the cameras 29A, 29B. As discussed above, in at least some embodiments, the processor 25 is configured to determine the real-time position of the user 15 in the environment based on front-facing images received from the front-facing stereo camera 29A, for example using SLAM techniques. In contrast, the processor 25 is configured to determine the real-time positions and poses of the arms and hands (and possibly fingers, as well) of the user 15 based on the downward facing images of the arms and hands of the 15, for example using a pose-tracking algorithm.

Next, the processor 25 uses DTW to calculate the similarity (i.e., a distance) between the real-time sequence of poses of the user 15 and the sequence of poses of the defined human action of the event. If the difference or DTW distance between the real-time sequence of poses of the user 15 and the sequence of poses of the defined human action of the event is less than a predetermined threshold, the processor 25 determines that the defined human action of the event has been performed. In the case that there are multiple events having similar human actions that are each within the predetermined threshold distance from the real-time sequence of poses of the user 15, then the processor 25 determines which of the multiple events is actually occurring using a nearest neighbor algorithm.

As discussed above, in some embodiments, a plurality of similar human actions from the human motion clip can be labeled by the user 15 as true-positive examples and false-positive examples for one user-defined event. In such embodiments, the processor 25 uses DTW to calculate the similarity (i.e., a distance) between the real-time sequence of poses of the user 15 and each of the previously labeled similar human actions from the human motion clip (as well as the original human action of the event). The processor 25 determines that the human action of the event has been performed in response to the real-time sequence of poses of the user 15 being less than a predetermined threshold difference or DTW distance from any of the similar human actions that were labeled as true-positive examples. However, the processor 25 determines that the human action of the event has not been performed in response to the real-time sequence of poses of the user 15 having a shortest DTW from one of the similar human actions that were labeled as false-positive examples. Consequently, the false positive detection rate is reduced while the true positive detection rate is increased.

Next, the processor 25 determines whether the associated context attributes have the defined values for the event. For example, in the case of object interaction context attributes, the processor 25 determines whether the real-time position of the object required to be interacted with for the event is within a threshold distance from the real-time position of the user 15 or of the hands of the user 15. For user location context attributes, the processor 25 determines the current value based on the real-time position of the user. For time of day context attributes, the processor 25 determines the current value based on the current time of day according to an internal clock. For IoT state context attributes, the processor 25 communicates with the IoT devices using suitable wireless communications. For other abstract context attributes (e.g., the "pill count" for the pill bottle in previous examples), the processor 25 reads the current value from the memory 26. Finally, if the associated context attributes have the defined values for the event and the human action of the event was detected, then the processor 25 determines that the event has occurred.

In the Action Mode, the method 100 continues with performing the action in response to detecting the defined event (block 155). Particularly, as noted above, in the Action Mode, the AR system 20 enables the user 15 to deploy and execute the authored CAPs as the user 15 goes about his or her daily life. To this end, the AR system 20 causes the defined actions or operations to be performed in response to detecting that a respective event has been performed. In the example of FIG. 1, the AR system 20 causes the kettle to turn on in response to detecting that the user picked up the cup 16 in the morning.

In some embodiments, the action to be performed includes displaying certain graphical elements in the AR graphical user interface. To this end, the processor 25 executes the AR graphics engine 34 to display the appropriate graphical elements in the AR graphical user interface on the display 28, superimposed in the environment appropriately. Several examples of such actions or operations involving the display of graphical elements in the AR graphical user interface are discussed in detail above.

Additionally, in some embodiments, the action to be performed includes operating an IoT device to perform an action or operation. To this end, the processor 25 generates, and transmits to the respective robot collaborator 40 (e.g., by operating the WiFi module 27), at least one command configured to operate an actuator of the IoT device to perform the appropriate action or operation. Several examples of such actions or operations involving the operation of an IoT device are discussed in detail above.

Finally, as discussed above, certain temporal properties can be applied to the events that modify the manner in which the events are detected or responded to. In the case that the duration temporal property was applied to the detected event, the processor 25 is configured to cause the responsive action to be performed in response to detecting the occurrence of the event continuously for the user-specified time duration. In the case that the delay temporal property was applied to the detected event, the processor 25 is configured to cause the responsive action to be performed in response to the user-specified time delay elapsing since detecting the occurrence of the event. In the case that the inverse temporal property was applied to the detected event, the processor 25 is configured to cause the responsive action to be performed only if the event is/was not detected.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for authoring an automation in which an operation is performed responsive to human actions in an environment, the method comprising:

synchronously recording, with at least one sensor, (i) human motions of a user in an environment, the recorded human motions including a plurality of recorded poses of the user in the environment over a period of time, and (ii) values for a context attribute over the period of time;

displaying, on a display, a graphical user interface including, superimposed on the environment, (i) a graphical representation of the recorded human motions including a graphical representation of the user superimposed on the environment, the graphical representation of the user representing a position and pose of the user at a particular time in the recorded human motions and (ii) a graphical representation of the recorded values for the context attribute;

moving, with a processor, based on user inputs received from the user, the graphical representation of the user to represent a position and pose of the user at a different particular time in the recorded human motions;

defining, with a processor, a first event by identifying, based on user inputs received from the user, (i) a first segment of the recorded human motions that corresponds to the first event and (ii) a first value for the context attribute that corresponds to the first event; and defining, with the processor, based on user inputs received from the user, a first operation to be performed in response to the first event occurring.

2. The method of claim 1, wherein the context attribute is an interaction of the user with an object in the environment, the displaying the graphical representation of the recorded values for the context attribute further comprising:

displaying, in the graphical user interface on the display, a virtual representation of the object that is superimposed on the environment at a current location of the object in the object; and animating, in the graphical user interface on the display, the virtual representation of the object if the user interacted with the object at the particular time in the recorded human motions currently represented by the graphical representation of the user.

3. The method of claim 1, wherein the context attribute is a state of an object in the environment, the displaying the graphical representation of the recorded values for the context attribute further comprising:

displaying, in the graphical user interface on the display, one of (i) a graphical icon and (ii) text that is superimposed on the environment next to the object in the environment, the one of (i) the graphical icon and (ii) the text indicating the state of the object at the particular time in the recorded human motions currently represented by the graphical representation of the user.

4. The method of claim 1, the identifying the first segment of the recorded human motions that corresponds to the first event further comprising:

moving, with the processor, based on user inputs received from the user, the graphical representation of the user to represent a position and pose of the user at a first time in the recorded human motions corresponding a start of the first segment of the recorded human motions; and moving, with the processor, based on user inputs received from the user, the graphical representation of the user to represent a position and pose of the user at a second time in the recorded human motions corresponding an end of the first segment of the recorded human motions.

5. The method of claim 1 further comprising:

selecting, with the processor, based on user inputs received from the user, a value for the context attribute; and moving, with the processor, in response to selecting the value for the context attribute, the graphical representation of the user to represent a position and pose of the user at a time in the recorded human motions at which the context attribute had the selected value.

6. The method according to claim 1 further comprising:

displaying, in the graphical user interface on the display, a plurality of graphical elements representing respective operations, wherein the defining the first operation to be performed in response to the first event occurring further comprises selecting, with the processor, based on user inputs received from the user, a first graphical element from the plurality of graphical elements that represents the first operation.

7. The method of claim 1 further comprising:

detecting an occurrence of the first event by detecting, with at the least one sensor, real-time performance of human motions corresponding to the first segment of the recorded human motions by one of the user and a further user, while the context attribute has the first value; and causing, with the processor, the first operation to be performed in response to detecting the occurrence of the first event.

8. The method of claim 7, the detecting the occurrence of the first event further comprising:

detecting, with the at least one sensor, real-time poses of the one of the user and the further user;

mapping, with the processor, the real-time poses to recorded poses of the first segment of the recorded human motions;

determining real-time values of the context attribute; and comparing, with the processor, the real-time values of the context attribute with the first value for the context attribute.

9. The method of claim 7 further comprising:

identifying, with the processor, a second segment of the recorded human motions that has a less than threshold difference compared to the first segment; and labeling, with the processor, based on user inputs received from the user, the second segment with a label, the label indicating one of (i) that second segment corresponds to the first event and (ii) that second segment does not correspond to the first event.

10. The method of claim 9 further comprising:

detecting whether the first event has occurred by (i) detecting, with at the least one sensor, real-time performance of human motions corresponding to the second segment of the recorded human motions by one of the user and a further user and (ii) determining whether the first event has occurred depending on the label of the second segment.

11. The method of claim 7, the causing the first operation to be performed further comprising:

generating, with the processor, and transmitting to a device, with a transceiver, a command configured to operate an actuator of the device to perform the first operation.

12. The method of claim 7, the causing the first operation to be performed further comprising:

displaying, in the graphical user interface on the display, one of (i) a virtual object that is overlaid atop the object in the environment and (ii) text that is superimposed on the environment next to the object in the environment.

13. The method of claim 7, the causing the first operation to be performed further comprising:
  modifying a value of a further context attribute; and
  storing the modified value of the further context attribute in a memory.

14. The method of claim 7 further comprising:
  defining, with the processor, a second event by identifying, based on user inputs received from the user, (i) a second segment of the recorded human motions that corresponds to the second event and (ii) a second value for the context attribute that corresponds to the second event;
  wherein the causing the first operation to be performed further comprises displaying, in the graphical user interface on the display, an animation of the second segment of the recorded human motions that corresponds to the second event.

15. The method of claim 7 further comprising:
  defining, with the processor, based on user inputs received from the user, a time duration for the first event,
  wherein the causing the first operation to be performed further comprises causing, with the processor, the first operation to be performed in response to detecting the occurrence of the first event continuously for the time duration.

16. The method of claim 7 further comprising:
  defining, with the processor, based on user inputs received from the user, a time delay for the first event,
  wherein the causing the first operation to be performed further comprises causing, with the processor, the first operation to be performed in response to the time delay elapsing since detecting the occurrence of the first event.

17. The method of claim 1 further comprising:
  defining, with the processor, a second event by identifying, based on user inputs received from the user, (i) a second segment of the recorded human motions that corresponds to the second event and (ii) a second value for the context attribute that corresponds to the second event;
  defining, with the processor, based on user inputs received from the user, a second operation to be performed in response to the event not occurring;
  detecting that the second event is not occurring by detecting, with at the least one sensor, real-time performance of human motions that do not corresponding to the second segment of the recorded human motions; and
  causing, with the processor, the second operation to be performed in response to detecting that the second event is not occurring.

18. A method for authoring an automation in which an operation is performed responsive to human actions in an environment, the method comprising:
  synchronously recording, with at least one sensor, (i) human motions of a user in an environment, the recorded human motions including a plurality of recorded poses of the user in the environment over a period of time, and (ii) values for a context attribute over the period of time;
  displaying, on a display, a graphical user interface including, superimposed on the environment, (i) a graphical representation of the recorded human motions and (ii) a graphical representation of the recorded values for the context attribute;
  defining, with a processor, a first event by identifying, based on user inputs received from the user, (i) a first segment of the recorded human motions that corresponds to the first event and (ii) a first value for the context attribute that corresponds to the first event;e
  defining, with the processor, based on user inputs received from the user, a first operation to be performed in response to the first event occurring;
  detecting an occurrence of the first event in response to detecting real-time performance of human motions corresponding to the first segment of the recorded human motions by one of the user and a further user, while the context attribute has the first value, the detecting the occurrence of the first event including (i) detecting, with the at least one sensor, real-time poses of the one of the user and the further user, (ii) mapping, with the processor, the real-time poses to recorded poses of the first segment of the recorded human motions, (iii) determining real-time values of the context attribute, and (iv) comparing, with the processor, the real-time values of the context attribute with the first value for the context attribute; and
  causing, with the processor, the first operation to be performed in response to detecting the occurrence of the first event.

19. A method for authoring an automation in which an operation is performed responsive to human actions in an environment, the method comprising:
  synchronously recording, with at least one sensor, (i) human motions of a user in an environment, the recorded human motions including a plurality of recorded poses of the user in the environment over a period of time, and (ii) values for a context attribute over the period of time;
  displaying, on a display, a graphical user interface including, superimposed on the environment, (i) a graphical representation of the recorded human motions including a graphical representation of the user superimposed on the environment, the graphical representation of the user representing a position and pose of the user at a particular time in the recorded human motions and (ii) a graphical representation of the recorded values for the context attribute;
  defining, with a processor, a first event by identifying, based on user inputs received from the user, (i) a first segment of the recorded human motions that corresponds to the first event and (ii) a first value for the context attribute that corresponds to the first event, the first segment of the recorded human motions being defined by moving, based on user inputs received from the user, the graphical representation of the user to represent a position and pose of the user at a first time in the recorded human motions corresponding a start of the first segment of the recorded human motions and moving, based on user inputs received from the user, the graphical representation of the user to represent a position and pose of the user at a second time in the recorded human motions corresponding an end of the first segment of the recorded human motions; and
  defining, with the processor, based on user inputs received from the user, a first operation to be performed in response to the first event occurring.

* * * * *